United States Patent
Liu et al.

(10) Patent No.: US 12,279,133 B2
(45) Date of Patent: Apr. 15, 2025

(54) REFERENCE SIGNAL TRANSMISSION USING QUASI CO-LOCATION (QCL) RESOURCES

(71) Applicant: BUNKER HILL TECHNOLOGIES LLC, Allen, TX (US)

(72) Inventors: Jin Liu, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 369 days.

(21) Appl. No.: 17/848,348

(22) Filed: Jun. 23, 2022

(65) Prior Publication Data

US 2022/0330042 A1 Oct. 13, 2022

Related U.S. Application Data

(63) Continuation of application No. PCT/CN2020/129818, filed on Nov. 18, 2020.

(51) Int. Cl.
*H04W 16/28* (2009.01)
*H04L 5/00* (2006.01)
(Continued)

(52) U.S. Cl.
CPC .......... *H04W 16/28* (2013.01); *H04L 5/0051* (2013.01); *H04W 72/0446* (2013.01); *H04W 72/0453* (2013.01)

(58) Field of Classification Search
CPC ............. H04W 16/28; H04W 72/0446; H04W 72/0453; H04W 24/10; H04W 52/0216;
(Continued)

(56) References Cited

U.S. PATENT DOCUMENTS

2015/0201369 A1 7/2015 Ng
2019/0052443 A1 2/2019 Cheng
(Continued)

FOREIGN PATENT DOCUMENTS

CN 107888266 A 4/2018
CN 109802787 A 5/2019
(Continued)

OTHER PUBLICATIONS

ISR received in application No. PCT/CN2020/129818 dated Feb. 20, 2021.
(Continued)

*Primary Examiner* — Rushil P. Sampat
(74) *Attorney, Agent, or Firm* — Ascenda Law Group, PC

(57) ABSTRACT

A method and device in a node for wireless communications. A first node transmits a first signaling; transmits a first reference signal and a second signal through a first antenna port in a first time-frequency resource set; the first signaling is used to indicate a number of time-frequency resource(s) used for the first reference signal in the first time-frequency resource set; the first reference signal is used to demodulate the second signal; the first antenna port conforms to a first Quasi Co-Located (QCL) relation, and the first QCL relationship is one of Q candidate QCL relationships; the number of time-frequency resource(s) used for the first reference signal in the first time-frequency resource set is used to indicate the first QCL relationship out of the Q candidate QCL relationships, Q being a positive integer greater than 1. The application effectively solves the signaling overhead problem of transmission configuration indication.

16 Claims, 7 Drawing Sheets

(51) Int. Cl.
*H04W 72/0446* (2023.01)
*H04W 72/0453* (2023.01)

(58) Field of Classification Search
CPC .......... H04W 52/0219; H04W 72/046; H04W 72/1263; H04W 72/542; H04L 5/0051; H04L 5/0094; H04B 7/0695; H04B 17/336; H04J 11/005
See application file for complete search history.

(56) References Cited

U.S. PATENT DOCUMENTS

| | | | | |
|---|---|---|---|---|
| 2020/0076553 | A1* | 3/2020 | Wang | H04L 5/0051 |
| 2020/0120531 | A1* | 4/2020 | Qin | H04B 7/0695 |
| 2020/0178280 | A1* | 6/2020 | Guan | H04B 7/0626 |

FOREIGN PATENT DOCUMENTS

| | | |
|---|---|---|
| CN | 110365458 A | 10/2019 |
| CN | 110431901 A | 11/2019 |
| CN | 110475262 A | 11/2019 |
| CN | 111226481 A | 6/2020 |
| EP | 3522427 A1 | 8/2019 |

OTHER PUBLICATIONS

CN201911356213.7 Notification to Grant Patent Right for Invention dated Jan. 24, 2022.
CN201911356213.7 First Search Report dated Dec. 31, 2021.
RI-1710071 "On QCL for NR": 3696 3GPP, QCL and (C51 or (reference 3d signal)) and resource+ and (associat+ or relation+) and configur+ and type and dmrs and pd Jun. 16, 2017.
RI-1702274 "2 5tage DCI Design for NR DL Control Channel": 3696 3GPP, QCL and (C51 or (reference 3d signal)) and resource+ and (associat+ or relation+) and configur+ and type and dmrs and pd (Dec. 15, 2019 and NR Feb. 6, 2017.
Huawei et al. 3GPP TSG RAN WG1 Meeting #89 RI-1706940,Details of QCL assumpTIons and related RS design considerations May 8, 2017.
Nokla et al. "3GPP TSG RAN WG1 #9 5 RI-1813980" Feature Lead Summan on QCL, Nov. 13, 2018.
"3rd Generation Partnership Project; Technical Specification Group Radio Access Network;NR; Physicallayer procedures for data (Release 15)" 3GPP TS 38.214 V15 .7.0, Sep. 28, 2019.

* cited by examiner

REFERENCE SIGNAL TRANSMISSION USING QUASI CO-LOCATION (QCL) RESOURCES

CROSS REFERENCE TO RELATED APPLICATIONS

This application is the continuation of International patent application PCT/CN2020/129818, filed on Nov. 18, 2020, which claims the priority benefit of Chinese Patent Application No. 201911356213.7, filed on Dec. 25, 2019, the full disclosure of which is incorporated herein by reference.

BACKGROUND

Technical Field

The present application relates to transmission methods and devices in wireless communication systems, and in particular to a sidelink-related transmission scheme and device in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary, NR-based V2X technical research was initialized, and later at first AdHoc meeting of RAN1 2019 it was generally agreed that the path-loss between a transmitter and a receiver of a V2X pair shall be taken as reference for transmit power of V2X.

SUMMARY

In NR V2X system, a variety of Demodulation Reference Signal Patterns (DMRS patterns) can be configured on a Physical Sidelink Shared Channel (PSSCH), a density of each DMRS pattern mapped on the PSSCH varies, and the denser the DMRS pattern, the better the anti-Doppler effect. Therefore, in general, high-speed moving UE should be configured with a denser DMRS pattern. When multi-beam is introduced in the future V2X system, a TX UE needs to notify an RX UE of a Transmission Configuration Indication (TCI) state. Since a number of TCI states is high, up to 64 or even 128, a notification of a TCI state in a Uu interface of NR is done by configuring 64 or 128 TCI states at the RRC layer, activating 8 TCI states at the MAC layer, and then indicating an exact TCI state through a Transmission Configuration Indication field in Downlink Control Information (DCI). However, since the V2X system cannot always maintain an RRC connection, the flexibility and the signaling overhead of the TCI state indication are a problem. However, when the UE moves at a high speed, the channel changes faster and it is more effective to transmit with fewer beams or quasi-omnidirectional method, so the TCI state can be reduced or even not indicated when the moving speed is faster.

To address the above problems, the present application discloses a scheme for TCI state indication, which indirectly indicates a range of TCI state by using a sidelink (SL) DMRS pattern, thus reducing the signaling overhead and ensuring a certain degree of flexibility. It should be noted that the embodiments in a User Equipment (UE) in the present application and characteristics of the embodiments may be applied to a base station if no conflict is incurred, and vice versa. And the embodiments in the present application and the characteristics in the embodiments can be arbitrarily combined if there is no conflict. Though originally targeted at SL, the present application is also applicable to uplink (UL). Though originally targeted at single-carrier communications, the present application is also applicable to multicarrier communications. Though originally targeted at single-antenna communications, the present application is also applicable to multi-antenna communications. Besides, the present application is not only targeted at V2X scenarios, but also at communication scenarios between terminal and base station, terminal and relay as well as relay and base station, where similar technical effect can be achieved. Additionally, the adoption of a unified solution for various scenarios, including but not limited to V2X scenarios and communication scenarios between terminal and base station, contributes to the reduction of hardware complexity and costs.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:
transmitting a first signaling; and
transmitting a first reference signal and a second signal through a first antenna port in a first time-frequency resource set;
herein, the first signaling is used to indicate the first time-frequency resource set, and the first signaling is used to indicate a number of time-frequency resource(s) used for the first reference signal in the first time-frequency resource set; the first reference signal is used to demodulate the second signal; the first antenna port conforms to a first Quasi Co-Located (QCL) relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to indicate the first QCL relationship out of the Q candidate QCL relationships, Q being a positive integer greater than 1.

In one embodiment, a problem to be solved in the present application is: the signaling overhead problem of TCI state indication in NR V2X systems under multi-beam conditions.

In one embodiment, a method in the present application is: establishing an association between an SL DMRS pattern and the TCI state.

In one embodiment, a method in the present application is: establishing an association between a number of time-frequency resource(s) used for the first reference signal in the first time-frequency resource set and the first QCL relationship.

In one embodiment, a method in the present application is: establishing an association between first information in a first signaling in the present application and a number of time-frequency resource(s) used for the first reference signal in the first time-frequency resource set.

In one embodiment, a method in the present application is: associating first information in a first signaling in the present application and a number of time-frequency resource(s) used for the first reference signal in the first time-frequency resource set with the first QCL relationship.

In one embodiment, the above method is characterized in that a number of time-frequency resource(s) used for the first reference signal in the first time-frequency resource set is related to a moving speed of the first node, while the moving speed of the first node is related to a range of the TCI state.

In one embodiment, the above method is characterized in that an application range of the TCI state is determined according to a number of time-frequency resource(s) used for the first reference signal in the first time-frequency resource set, which effectively reduces the signaling overhead of the TCI state indication.

According to one aspect of the present application, the above method is characterized in that any of the Q candidate QCL relationships comprises a candidate reference signal, the first QCL relationship comprises a first candidate reference signal, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q.

According to one aspect of the present application, the above method is characterized in that any of the Q candidate QCL relationships comprises a QCL type, the first QCL relationship comprises a first QCL type, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q.

According to one aspect of the present application, the above method is characterized in that the first signaling comprises first information, and the first information in the first signaling and the number of time-frequency resource(s) used for the first reference signal in the first time-frequency resource set are used together to determine the first QCL relationship out of the Q candidate QCL relationships.

According to one aspect of the present application, the above method is characterized in comprising:

receiving second information;

herein, the second information and the number of time-frequency resource(s) used for the first reference signal in the first time-frequency resource set are used together to determine Q0 candidate QCL relationship(s) out of the Q candidate QCL relationships, and the first information is used to determine the first QCL relationship out of the Q0 candidate QCL relationship(s).

According to one aspect of the present application, the above method is characterized in that the first signaling comprises first information, and the first information in the first signaling is used to determine the first QCL relationship out of the Q candidate QCL relationships; the number of time-frequency resource(s) used for the first reference signal in the first time-frequency resource set is used to determine whether the first information is disabled.

According to one aspect of the present application, the above method is characterized in that the first node is a UE.

According to one aspect of the present application, the above method is characterized in that the first node is a base station.

According to one aspect of the present application, the above method is characterized in that the first node is a relay node.

The present application provides a method in a second node for wireless communications, comprising:

receiving a first signaling; and receiving a first reference signal and a second signal in a first time-frequency resource set;

herein, the first signaling is used to determine the first time-frequency resource set, and the first signaling is used to determine a number of time-frequency resource(s) used for the first reference signal in the first time-frequency resource set; the first reference signal is used to demodulate the second signal; the first reference signal and the second signal is transmitted through a first antenna port, the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to determine the first QCL relationship out of the Q candidate QCL relationships, Q being a positive integer greater than 1.

According to one aspect of the present application, the above method is characterized in that any of the Q candidate QCL relationships comprises a candidate reference signal, the first QCL relationship comprises a first candidate reference signal, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q.

According to one aspect of the present application, the above method is characterized in that any of the Q candidate QCL relationships comprises a QCL type, the first QCL relationship comprises a first QCL type, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q.

According to one aspect of the present application, the above method is characterized in that the first signaling comprises first information, and the first information in the first signaling and the number of time-frequency resource(s) used for the first reference signal in the first time-frequency resource set are used together to determine the first QCL relationship out of the Q candidate QCL relationships.

According to one aspect of the present application, the above method is characterized in comprising:
receiving second information;
herein, the second information and the number of time-frequency resource(s) used for the first reference signal in the first time-frequency resource set are used together to determine Q0 candidate QCL relationship(s) out of the Q candidate QCL relationships, and the first information is used to determine the first QCL relationship out of the Q0 candidate QCL relationship(s).

According to one aspect of the present application, the above method is characterized in that the first signaling comprises first information, and the first information in the first signaling is used to determine the first QCL relationship out of the Q candidate QCL relationships; the number of time-frequency resource(s) used for the first reference signal in the first time-frequency resource set is used to determine whether the first information is disabled.

According to one aspect of the present application, the above method is characterized in that the second node is a UE.

According to one aspect of the present application, the above method is characterized in that the second node is a base station.

According to one aspect of the present application, the above method is characterized in that the second node is a relay node.

The present application provides a first node for wireless communications, comprising:
a first transmitter, transmitting a first signaling; and
a second transmitter, transmitting a first reference signal and a second signal through a first antenna port in a first time-frequency resource set;
herein, the first signaling is used to indicate the first time-frequency resource set, and the first signaling is used to indicate a number of time-frequency resource(s) used for the first reference signal in the first time-frequency resource set; the first reference signal is used to demodulate the second signal; the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to indicate the first QCL relationship out of the Q candidate QCL relationships, Q being a positive integer greater than 1.

The present application provides a second node for wireless communications, comprising:
a second receiver, receiving a first signaling; and
a third receiver, receiving a first reference signal and a second signal in a first time-frequency resource set;
herein, the first signaling is used to determine the first time-frequency resource set, and the first signaling is used to determine a number of time-frequency resource(s) used for the first reference signal in the first time-frequency resource set; the first reference signal is used to demodulate the second signal; the first reference signal and the second signal is transmitted through a first antenna port, the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to determine the first QCL relationship out of the Q candidate QCL relationships, Q being a positive integer greater than 1.

In one embodiment, the present application is advantageous in the following aspects:
the present application establishes an association between an SL DMRS pattern and a HARQ feedback.
the present application establishes an association in a relationship between a number of time-frequency resource(s) used for the first reference signal in the first time-frequency resource set in the present application and whether the first information is transmitted.
the present application associates a first distance in the present application and a number of time-frequency resource(s) used for the first reference signal in the first time-frequency resource set with whether the first information is transmitted.
in the present application, whether the first information is transmitted is related to the number of time-frequency resource(s) used for the first reference signal in the first time-frequency resource set, which avoids an invalid HARQ feedback.
the present application effectively solves the problem of resource waste and transmission delay incurred by the HARQ feedback failure under the condition of high-speed movement.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
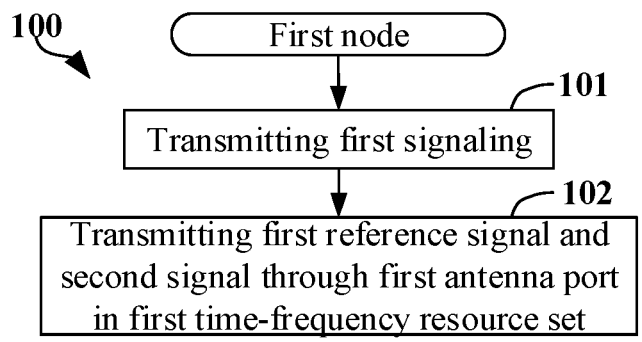
FIG. 1 illustrates a flowchart of the processing of a first node according to one embodiment of the present application.

Embodiment 1 illustrates a flowchart of the processing of a first node according to one embodiment of the present application, as shown in FIG. 1. In FIG. 1, each block represents a step. In embodiment 1, a first node in the present application first transmits a first signaling in step 101; then transmits a first reference signal and a second signal through a first antenna port in a first time-frequency resource set in step 102; the first signaling is used to indicate the first time-frequency resource set, and the first signaling is used to indicate a number of time-frequency resource(s) used for the first reference signal in the first time-frequency resource set; the first reference signal is used to demodulate the second signal; the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to indicate the first QCL relationship out of the Q candidate QCL relationships, Q being a positive integer greater than 1.

In one embodiment, a channel occupied by the first signaling comprises a Physical Sidelink Control Channel (PSCCH).

In one embodiment, a channel occupied by the first signaling comprises a Physical Sidelink Shared Channel (PSSCH).

In one embodiment, a channel occupied by the first signaling comprises a Physical Downlink Control Channel (PDCCH).

In one embodiment, the first signaling is broadcast.

In one embodiment, the first signaling is groupcast.

In one embodiment, the first signaling is unicast.

In one embodiment, the first signaling is Cell-specific.

In one embodiment, the first signaling is UE-specific.

In one embodiment, the first signaling comprises one or a plurality of fields in a piece of Sidelink Control Information (SCI).

In one embodiment, the first signaling is SCI.

In one embodiment, the first signaling comprises a first sub-signaling.

In one embodiment, the first signaling comprises a second sub-signaling.

In one embodiment, the first signaling comprises the first sub-signaling and the second sub-signaling.

In one embodiment, the first sub-signaling comprises a 1st-stage SCI.

In one embodiment, the second sub-signaling comprises a 2nd-stage SCI.

In one embodiment, the first signaling comprises a first sub-signaling and a second sub-signaling, and the first sub-signaling and the second sub-signaling respectively comprise a 1st-stage SCI and a 2nd-stage SCI.

In one embodiment, a channel occupied by the first sub-signaling comprises a PSCCH, and a channel occupied by the second sub-signaling comprises a PSSCH.

In one embodiment, the first signaling comprises one or a plurality of fields in a piece of DCI.

In one embodiment, the first signaling comprises all or partial a higher-layer signaling.

In one embodiment, the first signaling is semi-statically configured.

In one embodiment, the first signaling is dynamically configured.

In one embodiment, the first signaling comprises one or a plurality of fields in a Configured Grant.

In one embodiment, the first signaling is the Configured Grant.

In one embodiment, the definition of the Configured Grant refers to section 6.1.2.3 in 3GPP TS38.214.

In one embodiment, the first signaling is used to schedule the second signal.

In one embodiment, the first signaling indicates a Modulation and Coding Scheme (MCS) of the second signal.

In one embodiment, the first signaling indicates a Redundancy Version (RV) of the second signal.

In one embodiment, the first signaling indicates a resource reservation period.

In one embodiment, the first signaling indicates a priority of the second signal.

In one embodiment, the first signaling indicates the first reference signal.

In one embodiment, the first signaling indicates a spectrum of the first reference signal.

In one embodiment, the first signaling indicates a number of antenna port(s) occupied by the first reference signal.

In one embodiment, the first signaling indicates the first antenna port.

In one embodiment, the first signaling indicates the first time-frequency resource set.

In one embodiment, the first signaling indicates time-frequency resources comprised in the first time-frequency resource set.

In one embodiment, the first time-frequency resource set comprises a plurality of Resource Elements (REs), and the first signaling indicates the plurality of REs comprised in the first time-frequency resource set.

In one embodiment, the first signaling indicates time-domain resources comprised in the first time-frequency resource set.

In one embodiment, the first time-frequency resource set comprises at least one slot, and the first signaling indicates the at least one slot comprised in the first time-frequency resource set.

In one embodiment, the first time-frequency resource set comprises at least one multicarrier symbol, and the first signaling indicates the at least one multicarrier symbol comprised in the first time-frequency resource set.

In one embodiment, the first signaling indicates frequency-domain resources comprised in the first time-domain resource set.

In one embodiment, the first time-frequency resource set comprises at least one sub-channel, and the first signaling indicates the at least one sub-channel comprised in the first time-frequency resource set.

In one embodiment, the first time-frequency resource set comprises at least one Physical Resource Block (PRB), and the first signaling indicates the at least one PRB comprised in the first time-frequency resource set.

In one embodiment, the first signaling comprises at least one first-type field, and the first time-frequency resource set is a first-type field in the at least one first-type field.

In one embodiment, the first signaling comprises at least one first-type field, and the first time-frequency resource set, the priority of the second signal, the pattern of the first reference signal, a number of the antenna port(s) occupied by the first reference signal and the MCS of the second signal are respectively a first-type field in the at least one first-type field.

In one embodiment, the first reference signal is generated by a pseudo-random sequence.

In one embodiment, the first reference signal is generated by a Gold sequence.

In one embodiment, the first reference signal is generated by an M-sequence.

In one embodiment, the first reference signal is generated by a Zadeoff-Chu sequence.

In one embodiment, a generation method of the first reference signal refers to section 6.4.1.1.1 in 3GPP TS38.211.

In one embodiment, the first reference signal is Cell-specific.

In one embodiment, the first reference signal is UE-specific.

In one embodiment, the first reference signal comprises a Demodulation Reference Signal (DMRS).

In one embodiment, the first reference signal comprises a PSSCH DMRS.

In one embodiment, the first reference signal comprises a PSCCH DMRS.

In one embodiment, the first reference signal comprises a Channel State Information Reference Signal (CSI-RS).

In one embodiment, the first reference signal is used to demodulate the second signal.

In one embodiment, the first reference signal is used to measure Reference Signal Received Power (RSRP) of a physical link used to transmit the first reference signal.

In one embodiment, the first reference signal is used to measure RSRP of SL.

In one embodiment, the phrase of the first reference signal being used to demodulate the first radio signal includes: the first reference signal and the first radio signal are transmitted by a same antenna port.

In one embodiment, the phrase of the first reference signal being used to demodulate the first radio signal includes: small-scale channel parameters that the first reference signal is conveyed is used to infer small-scale channel parameters that the first radio signal is conveyed.

In one embodiment, the first signaling is used to determine a number of time-frequency resource(s) used for the first reference signal in the first time-frequency resource set.

In one embodiment, the first time-frequency resource set comprises a plurality of multicarrier symbols, and the first signaling indicates a number of multicarrier symbol(s) occupied by the first reference signal in the first time-frequency resource set.

In one embodiment, the first signaling indicates a position of multicarrier symbol(s) occupied by the first reference signal in the first time-frequency resource set, and the position of the multicarrier symbol(s) occupied by the first reference signal in the first time-frequency resource set is used to determine a number of multicarrier symbol(s) occupied by the first reference signal in the first time-frequency resource set.

In one embodiment, the first signaling indicates a multicarrier symbol occupied by the first reference signal in the first time-frequency resource set, and the multicarrier symbol occupied by the first reference signal in the first time-frequency resource set is used to determine a number of time-frequency resource(s) occupied by the first reference signal in the first time-frequency resource set.

In one embodiment, the first signaling indicates a position of multicarrier symbol(s) occupied by the first reference signal in the first time-frequency resource set, and the position of the multicarrier symbol(s) occupied by the first reference signal in the first time-frequency resource set is used to determine a number of time-frequency resource(s) occupied by the first reference signal in the first time-frequency resource set.

In one embodiment, a position of multicarrier symbol(s) occupied by the first reference signal in the first time-frequency resource set is determined by the number of multicarrier symbol(s) occupied by the first reference signal in the first time-frequency resource set.

In one embodiment, the first time-frequency resource set comprises a plurality of RE(s), and the first signaling indicates a number of RE(s) occupied by the first reference signal in the first time-frequency resource set.

In one embodiment, the first signaling indicates an RE occupied by the first reference signal in the first time-frequency resource set, and the RE occupied by the first reference signal in the first time-frequency resource set is used to determine a number of time-frequency resource(s) occupied by the first reference signal in the first time-frequency resource set.

In one embodiment, the first signaling indicates a position of RE(s) occupied by the first reference signal in the first time-frequency resource set, and the position of the RE(s) occupied by the first reference signal in the first time-frequency resource set is used to determine a number of time-frequency resource(s) occupied by the first reference signal in the first time-frequency resource set.

In one embodiment, the first signaling indicates the first antenna port, and the first antenna port is used to determine a number of time-frequency resource(s) occupied by the first reference signal in the first time-frequency resource set.

In one embodiment, the first signaling indicates the first antenna port, and the first antenna port is used to determine a number of RE(s) occupied by the first reference signal in the first time-frequency resource set.

In one embodiment, the first radio signal is transmitted through a Sidelink Shared Channel (SL-SCH).

In one embodiment, the first radio signal is transmitted through a PSSCH.

In one embodiment, the first radio signal is transmitted through a Physical Downlink Shared Channel (PDSCH).

In one embodiment, the first radio signal comprises a 2nd-stage SCI.

In one embodiment, the 2nd-stage SCI comprises an identifier of a transmitter of the first radio signal.

In one embodiment, the 2nd-stage SCI comprises an identifier of a target receiver of the first radio signal.

In one embodiment, the first radio signal comprises a first bit block set, the first bit block set comprises at least one first-type bit block, and any of the at least one first-type bit block comprises at least one bit.

In one embodiment, the first bit block set is used to generate the first signal.

In one embodiment, the first bit block set comprises data transmitted on an SL-SCH.

In one embodiment, the first-type bit block comprises one Codeword (CW).

In one embodiment, the first-type bit block comprises one Code Block (CB).

In one embodiment, the first-type bit block comprises one Code Block Group (CBG).

In one embodiment, the first-type bit block comprises one Transport Block (TB).

In one embodiment, the first radio signal is obtained after all or partial bits of the first bit block set sequentially subjected to transport block-level Cyclic Redundancy Check (CRC) attachment, Code Block Segmentation, code block-level CRC attachment, Channel Coding, Rate Matching, Code Block Concatenation, Scrambling, Modulation, Layer Mapping, Antenna Port Mapping, Mapping to Physical Resource Blocks, Baseband Signal Generation and Modulation and Upconversion.

In one embodiment, the first radio signal is an output after the first bit block set is sequentially subjected to a modulation mapper, a layer mapper, precoding, a resource element mapper, and multicarrier symbol generation.

In one embodiment, the channel coding is based on a polar code.

In one embodiment, the channel coding is based on a Low-density Parity-Check (LDPC) code.

In one embodiment, only the first bit block set is used to generate the first radio signal.

In one embodiment, there exists a bit block other than the first bit block set being used to generate the first radio signal.

In one embodiment, an antenna port refers to: a channel over which a multicarrier symbol transmitted on the antenna port is conveyed is used to infer a channel over which another multicarrier symbol transmitted on the antenna port is conveyed.

In one embodiment, a first multicarrier symbol is transmitted through a first antenna port, a second multicarrier is transmitted through the first antenna port, and a channel over which the first multicarrier symbol is conveyed is allowed to infer a channel over which the second multicarrier symbol is conveyed.

In one embodiment, a first multicarrier symbol is transmitted through a first antenna port, a second multicarrier is transmitted through the first antenna port, and a channel over which the first multicarrier symbol is conveyed is used to infer a channel over which the second multicarrier symbol is conveyed.

In one embodiment, the first reference signal is transmitted through the first antenna port, the second signal is transmitted the first antenna port, and a channel over which the first reference signal is conveyed is allowed to infer a channel over which the second signal is conveyed.

In one embodiment, a multicarrier symbol comprised in the first reference signal is transmitted through the first antenna port, a multicarrier symbol comprised in the second signal is transmitted through the first antenna port, and a channel over which a multicarrier symbol comprised in the first reference signal is conveyed is allowed to be used to infer a channel over which a multicarrier symbol comprised in the second signal is conveyed.

In one embodiment, any of the Q candidate QCL relationships comprises at least one of a candidate reference signal or a QCL type.

In one embodiment, Q is a positive integer greater than 1.
In one embodiment, Q is equal to 128.
In one embodiment, Q is equal to 64.
In one embodiment, Q is equal to 8.

In one embodiment, any of the Q candidate QCL relationships comprises a candidate reference signal.

In one embodiment, any of the Q candidate QCL relationships comprises a QCL type.

In one embodiment, any of the Q candidate QCL relationships comprises a candidate reference signal and a QCL type.

In one embodiment, a candidate reference signal comprised in any of the Q candidate QCL relationships is one of a Synchronization Signal/Physical Broadcast Channel block (SS/PBCH block) and a Channel State Information-Reference Signal (CSI-RS).

In one embodiment, a candidate reference signal comprised in any of the Q candidate QCL relationships is one of an SL SS/PBCH block and an SL CSI-RS.

In one embodiment, a candidate reference signal comprised in at least one of the Q candidate QCL relationships is broadcast.

In one embodiment, a candidate reference signal comprised in at least one of the Q candidate QCL relationships is determined by default.

In one embodiment, a candidate reference signal comprised in at least one of the Q candidate QCL relationships comprises a synchronization signal.

In one embodiment, a candidate reference signal comprised in at least one of the Q candidate QCL relationships comprises a broadcast signal.

In one embodiment, a candidate reference signal comprised in at least one of the Q candidate QCL relationships comprises an SS/PBCH block.

In one embodiment, a candidate reference signal comprised in at least one of the Q candidate QCL relationships comprises a CSI-RS.

In one embodiment, a QCL type comprised in at least one of the Q candidate QCL relationships is 'QCL typeA'.

In one embodiment, a QCL type comprised in at least one of the Q candidate QCL relationships is 'QCL typeB'.

In one embodiment, a QCL type comprised in at least one of the Q candidate QCL relationships is 'QCL typeC'.

In one embodiment, a QCL type comprised in at least one of the Q candidate QCL relationships is 'QCL typeD'.

In one embodiment, a QCL type comprised in any of the Q candidate QCL relationships is one of 'QCL type A', 'QCL type B', 'QCL type C', and 'QCL type D'.

In one embodiment, a QCL type comprised in any of the Q candidate QCL relationships is one of a fifth type and a sixth type.

In one subembodiment of the above embodiment, the fifth type is Quasi-Co-Location (QCL).

In one subembodiment of the above embodiment, the sixth type is non-Quasi-Co-Location (non-QCL).

In one embodiment, the Q candidate QCL relationships are predefined.

In one embodiment, the Q candidate QCL relationships are configurable.

In one embodiment, the Q candidate QCL relationships are configured by third information.

In one embodiment, the Q candidate QCL relationships are activated by third information.

In one embodiment, the third information is all or part of a higher-layer signaling.

In one embodiment, the third information is all or part of an RRC-layer signaling.

In one embodiment, the third information is one or a plurality of fields in an RRC IE.

In one embodiment, the third information is a TCI-State IE.

In one subembodiment of the above embodiment, the definition of the TCI-State IE refers to section 6.3.2 in 3GPP TS38.331.

In one embodiment, the third information is all or part of a Medium Access Control (MAC)-layer signaling.

In one embodiment, the third information is one or a plurality of fields in a MAC CE.

In one embodiment, the third information is tci-PresentIn-DCI.

In one embodiment, the third information is a TCI State Activation/Deactivation for UE-specific PDSCH MAC CE.

In one subembodiment of the above embodiment, the definition of TCI State Activation/Deactivation for UE-specific PDSCH MAC CE refers to section 6.1.3.14 in 3GPP TS38.321.

In one embodiment, the third information is a TCI State Indication for UE-specific PDSCH MAC CE.

In one subembodiment of the above embodiment, the definition of TCI State Indication for UE-specific PDSCH MAC CE refers to section 6.1.3.14 in 3GPP TS 38.321.

In one embodiment, the third information comprises an identifier of any of the Q candidate QCL relationships.

In one embodiment, the third information comprises a TCI-StateId.

In one subembodiment of the above embodiment, the definition of the TCI-StateId refers to section 6.3.2 in 3GPP TS 38.331.

In one embodiment, the third information comprises an index of any of the Q candidate QCL relationships in the Q candidate QCL relationships.

In one embodiment, the third information comprises resources of a candidate reference signal comprised in any of the Q candidate QCL relationships.

In one embodiment, the third information comprises a resource identifier of a candidate reference signal comprised in any of the Q candidate QCL relationships.

In one embodiment, the third information comprises a NZP-CSI-RS-ResourceId.

In one subembodiment of the above embodiment, the definition of the NZP-CSI-RS-ResourceId refers to section 6.3.2 in 3GPP TS38.331.

In one embodiment, the third information comprises an SSB-Index.

In one subembodiment of the above embodiment, the definition of the SSB-Index refers to section 6.3.2 in 3GPP TS38.331.

In one embodiment, the first QCL relationship is one of the Q candidate QCL relationships, and the first QCL relationship comprises a first candidate reference signal and a first QCL type.

In one embodiment, when the first QCL type in the first QCL relationship is a fifth type, a channel over which the first candidate reference signal is conveyed can be used to determine large-scale properties that a radio signal transmitted by the first antenna port is conveyed; when the first QCL type in the first QCL relationship is a sixth type, a channel over which the first candidate reference signal is conveyed cannot be used to determine large-scale properties that a radio signal transmitted by the first antenna port is conveyed.

In one embodiment, when the first QCL type in the first QCL relationship is a fifth type, large-scale properties of a channel over which the first candidate reference signal is conveyed can be used to determine large-scale properties that a radio signal transmitted by the first antenna port is conveyed; when the first QCL type in the first QCL relationship is a sixth type, large-scale properties that the first candidate reference signal is conveyed cannot be used to determine large-scale properties that a radio signal transmitted by the first antenna port is conveyed.

In one embodiment, when the first QCL type in the first QCL relationship is a fifth type, a channel over which the first candidate reference signal is conveyed can be used to determine large-scale properties that the first reference signal transmitted by the first antenna port is conveyed; when the first QCL type in the first QCL relationship is a sixth type, a channel over which the first candidate reference signal is conveyed cannot be used to determine large-scale properties that the first reference signal transmitted by the first antenna port is conveyed.

In one embodiment, when the first QCL type in the first QCL relationship is QCL, a channel over which the first candidate reference signal is conveyed can be used to determine large-scale properties that the first reference signal transmitted by the first antenna port is conveyed.

In one embodiment, the first QCL relationship is used for receptions of the first reference signal and the second signal.

In one embodiment, the first QCL relationship is used for transmissions of the first reference signal and the second signal.

In one embodiment, QCL refers to: a channel over which a multicarrier transmitted by an antenna port is conveyed can be used to infer large-scale properties of a channel over which a multicarrier symbol transmitted by another antenna port is conveyed.

In one embodiment, non-QCL refers to: a channel over which a multicarrier transmitted by an antenna port is conveyed cannot be used to infer large-scale properties of a channel over which a multicarrier symbol transmitted by another antenna port is conveyed.

In one embodiment, QCL refers to: large-scale properties of a channel over which a multicarrier transmitted by an antenna port is conveyed can be used to infer large-scale properties of a channel over which a multicarrier symbol transmitted by another antenna port is conveyed.

In one embodiment, non-QCL refers to: large-scale properties of a channel over which a multicarrier transmitted by an antenna port is conveyed cannot be used to infer large-scale properties of a channel over which a multicarrier symbol transmitted by another antenna port is conveyed.

In one embodiment, QCL refers to: large-scale properties of a channel over which a multicarrier symbol on an antenna port is conveyed can be inferred from a channel over which a multicarrier symbol on another antenna port is conveyed.

In one embodiment, non-QCL refers to: large-scale properties of a channel over which a multicarrier symbol on an antenna port is conveyed cannot be inferred from a channel over which a multicarrier symbol on another antenna port is conveyed.

In one embodiment, QCL refers to: a first multicarrier symbol is transmitted through a first antenna port, a second multicarrier is transmitted through a second antenna port, and a channel over which the first multicarrier symbol is conveyed can be used to infer large-scale properties of a channel over which the second multicarrier symbol is conveyed.

In one embodiment, non-QCL refers to: a first multicarrier symbol is transmitted through a first antenna port, a second multicarrier is transmitted through a second antenna port, and a channel over which the first multicarrier symbol is conveyed cannot be used to infer large-scale properties of a channel over which the second multicarrier symbol is conveyed.

In one embodiment, two antenna ports being QCL refers to: the two antenna port comprises a first target antenna port and a second target antenna port, and a channel over which a multicarrier symbol transmitted by the first antenna port in the two antenna ports is conveyed can be used to infer large-scale properties of a channel over which a multicarrier symbol transmitted by the second antenna port in the two antenna ports is conveyed.

In one embodiment, two antenna ports being non-QCL refers to: the two antenna port comprises a first target antenna port and a second target antenna port, and a channel over which a multicarrier symbol transmitted by the first antenna port in the two antenna ports is conveyed cannot be used to infer large-scale properties of a channel over which a multicarrier symbol transmitted by the second antenna port in the two antenna ports is conveyed.

In one embodiment, a second target antenna port and a first target antenna port being QCL refers to: a first multicarrier symbol is transmitted through the first target antenna port, a second multicarrier is transmitted through the second target antenna port, and a channel over which the first multicarrier symbol is conveyed can be used to infer large-scale properties of a channel over which the second multicarrier symbol is conveyed.

In one embodiment, a second target antenna port and a first target antenna port being non-QCL refers to: a first multicarrier symbol is transmitted through the first target antenna port, a second multicarrier is transmitted through the second target antenna port, and a channel over which the first multicarrier symbol is conveyed cannot be used to infer large-scale properties of a channel over which the second multicarrier symbol is conveyed.

In one embodiment, a second target antenna port and a first target antenna port being QCL refers to: a first multicarrier symbol is transmitted through the first target antenna port, a second multicarrier is transmitted through the second target antenna port, and a channel over which the first multicarrier symbol is conveyed is used to infer large-scale properties of a channel over which the second multicarrier symbol is conveyed.

In one embodiment, a second target antenna port and a first target antenna port being non-QCL refers to: a first multicarrier symbol is transmitted through the first target antenna port, a second multicarrier is transmitted through the second target antenna port, and a channel over which the first multicarrier symbol is conveyed is not used to infer large-scale properties of a channel over which the second multicarrier symbol is conveyed.

In one subembodiment of the above embodiment, the first target antenna port comprises the first antenna port in the present application, and the first multicarrier symbol belongs to the first reference signal in the present application.

In one subembodiment of the above embodiment, the second target antenna port comprises an antenna port that the first reference signal in the present application is through, and the second multicarrier symbol belongs to the first reference signal in the present application.

In one embodiment, large-scale properties comprise one or a plurality of delay spread, Doppler spread, Doppler shift, average gain, average delay and spatial Rx parameters.

In one embodiment, the large-scale properties comprise delay spread.

In one embodiment, the large-scale properties comprise Doppler spread.

In one embodiment, the large-scale properties comprise Doppler shift.

In one embodiment, the large-scale properties comprise average gain.

In one embodiment, the large-scale properties comprise average delay.

In one embodiment, the large-scale properties comprise spatial Rx parameters.

In one embodiment, the first QCL relationship is one of the Q candidate QCL relationships, and the first QCL relationship comprises a first candidate reference signal.

In one embodiment, the first QCL relationship is one of the Q candidate QCL relationships, and the first QCL relationship comprises a first QCL type.

In one embodiment, the first QCL relationship comprises a Sidelink Bandwidth Part (SL BWP) where the first candidate reference signal is located.

In one embodiment, the first QCL relationship comprises a Sidelink Resource Pool (SL RP) where the first candidate reference signal is located.

In one embodiment, the first candidate reference signal is broadcast.

In one embodiment, the first candidate reference signal is determined by default.

In one embodiment, the first candidate reference signal comprises a synchronization signal.

In one embodiment, the first candidate reference signal comprises a broadcast signal.

In one embodiment, the first candidate reference signal comprises an SS/PBCH block.

In one embodiment, the first candidate reference signal comprises an SL SS/PBCH block.

In one embodiment, the first candidate reference signal comprises a CSI-RS.

In one embodiment, the first candidate reference signal comprises a periodic CSI-RS.

In one embodiment, the first candidate reference signal comprises an aperiodic CSI-RS.

In one embodiment, the first candidate reference signal comprises an SL CSI-RS.

In one embodiment, the first candidate reference signal comprises a Tracking Reference Signal (TRS).

In one embodiment, the first candidate reference signal comprises a Sidelink Tracking Reference Signal (SL TRS).

In one embodiment, the first candidate reference signal comprises a Physical Sidelink Control Channel Demodulation Reference Signal (PSCCH DMRS).

In one embodiment, the first candidate reference signal comprises a CSI-RS resource.

In one embodiment, the first candidate reference signal comprises a periodic CSI-RS resource.

In one embodiment, the first candidate reference signal comprises an aperiodic CSI-RS resource.

In one embodiment, the first candidate reference signal comprises an SL CSI-RS resource.

In one embodiment, the first candidate reference signal comprises an antenna port of a PSCCH DMRS.

In one embodiment, the first QCL type is one of N QCL types, N being a positive integer greater than 1.

In one embodiment, one of the N QCL type(s) comprises one or a plurality of the large-scale properties.

In one embodiment, any of the N QCL type(s) is one of 'QCL-TypeA', 'QCL-TypeB', 'QCL-TypeC' and 'QCL-TypeD'.

In one embodiment, any of the N QCL type(s) is one of a fifth type and a sixth type.

In one embodiment, any of the N QCL type(s) is one of 'QCL-TypeA', 'QCL-TypeB', 'QCL-TypeC', 'QCL-TypeD' and a sixth type.

In one embodiment, 'QCL-TypeA' comprises Doppler shift, Doppler spread, average delay and delay spread.

In one embodiment, 'QCL-TypeB' comprises Doppler shift and Doppler spread.

In one embodiment, 'QCL-TypeC' comprises Doppler shift and average delay.

In one embodiment, 'QCL-TypeD' comprises spatial Rx parameters.

In one embodiment, the fifth type is 'QCL'.

In one embodiment, the sixth type is 'non-QCL'.

In one embodiment, N is equal to 4, and the N QCL types are respectively 'QCL-TypeA', 'QCL-TypeB', 'QCL-TypeC' and 'QCL-TypeD'.

In one embodiment, N is equal to 5, and the N QCL types are respectively QCL-TypeA', 'QCL-TypeB', 'QCL-TypeC', 'QCL-TypeD' and 'non-QCL'.

In one embodiment, the first QCL type is one of 'QCL-TypeA', 'QCL-TypeB', 'QCL-TypeC' or 'QCL-TypeD'.

In one embodiment, the first QCL type is one of 'QCL' or 'non-QCL'.

In one embodiment, the first QCL type is one of 'QCL-TypeA', 'QCL-TypeB', 'QCL-TypeC', 'QCL-TypeD' or 'non-QCL'.

In one embodiment, the first QCL type is 'QCL-TypeA'.
In one embodiment, the first QCL type is 'QCL-TypeB'.
In one embodiment, the first QCL type is 'QCL-TypeC'.
In one embodiment, the first QCL type is 'QCL-TypeD'.
In one embodiment, the first QCL type is the fifth type.
In one embodiment, the first QCL type is 'QCL'.
In one embodiment, the first QCL type is the sixth type.
In one embodiment, the first QCL type is 'non-QCL'.

In one embodiment, the first antenna port conforming to a first QCL relationship refers to: the first reference signal transmitted through the first antenna port and the first candidate reference signal in the first QCL relationship are QCL.

In one embodiment, the first antenna port conforming to a first QCL relationship refers to: a QCL type between the first reference signal transmitted through the first antenna port and the first candidate reference signal in the first QCL relationship is the first QCL type.

In one embodiment, the first antenna port conforming to a first QCL relationship refers to: a channel over which the first candidate reference signal in the first QCL relationship is conveyed can be used to infer large-scale properties of a channel over which the first reference signal transmitted by the first antenna port is conveyed, and large-scale properties of a channel over which the first reference signal transmitted by the first antenna port is conveyed belong to the first QCL type in the first QCL relationship.

In one embodiment, the first antenna port conforming to a first QCL relationship refers to: large-scale properties of a channel over which the first reference signal transmitted through the first antenna port is conveyed can be inferred from a channel over which the first candidate reference signal in the first QCL relationship is conveyed, and the large-scale properties of a channel over which the first reference signal transmitted through the first antenna port is conveyed belong to the first QCL type in the first QCL type.

In one embodiment, the first antenna port conforming to a first QCL relationship refers to: a channel over which the first candidate reference signal in the first QCL relationship is conveyed can be used to infer large-scale properties in the first QCL type of a channel over which the first reference signal transmitted by the first antenna port is conveyed.

In one embodiment, the first antenna port conforming to a first QCL relationship refers to: a channel over which the first candidate reference signal in the first QCL relationship is conveyed is used to infer large-scale properties in the first QCL type of a channel over which the first reference signal transmitted by the first antenna port is conveyed.

In one embodiment, the first antenna port conforming to a first QCL relationship refers to: when the first QCL type in the first QCL relationship is 'non-QCL', a channel over which the first candidate reference signal in the first QCL relationship is conveyed cannot be used to infer large-scale properties of a channel over which the first reference signal transmitted by the first antenna port is conveyed.

In one embodiment, the first antenna port conforming to a first QCL relationship refers to: when the first QCL type in the first QCL relationship is the sixth type, a channel over which the first candidate reference signal in the first QCL relationship is conveyed cannot be used to infer large-scale properties of a channel over which the first reference signal transmitted by the first antenna port is conveyed.

In one embodiment, the first antenna port conforming to a first QCL relationship refers to: when the first QCL type in the first QCL relationship is the fifth type, a channel over which the first candidate reference signal in the fifth QCL relationship is conveyed can be used to infer large-scale properties of a channel over which the first reference signal transmitted by the first antenna port is conveyed.

In one embodiment, the first antenna port conforming to a first QCL relationship refers to: when the first QCL type in the first QCL relationship is 'QCL', a channel over which the first candidate reference signal in the first QCL relationship is conveyed can be used to infer large-scale properties of a channel over which the first reference signal transmitted by the first antenna port is conveyed.

In one embodiment, the first antenna port conforming to a first QCL relationship refers to: when the first QCL type in the first QCL relationship is 'QCL-TypeA', a channel over which the first candidate reference signal in the first QCL relationship is conveyed can be used to infer Doppler offset, Doppler spread, average delay and delay spread of a channel over which the first reference signal transmitted by the first antenna port is conveyed.

In one embodiment, the first antenna port conforming to a first QCL relationship refers to: when the first QCL type in the first QCL relationship is 'QCL-TypeB', a channel over which the first candidate reference signal in the first QCL relationship is conveyed can be used to infer Doppler offset and Doppler spread of a channel over which the first reference signal transmitted by the first antenna port is conveyed.

In one embodiment, the first antenna port conforming to a first QCL relationship refers to: when the first QCL type in the first QCL relationship is 'QCL-TypeC', a channel over which the first candidate reference signal in the first QCL relationship is conveyed can be used to infer Doppler offset and average delay of a channel over which the first reference signal transmitted by the first antenna port is conveyed.

In one embodiment, the first antenna port conforming to a first QCL relationship refers to: when the first QCL type in the first QCL relationship is 'QCL-TypeD', a channel over which the first candidate reference signal in the first QCL relationship is conveyed can be used to infer spatial Rx parameters of a channel over which the first reference signal transmitted by the first antenna port is conveyed.

Embodiment 2

Figure 2:
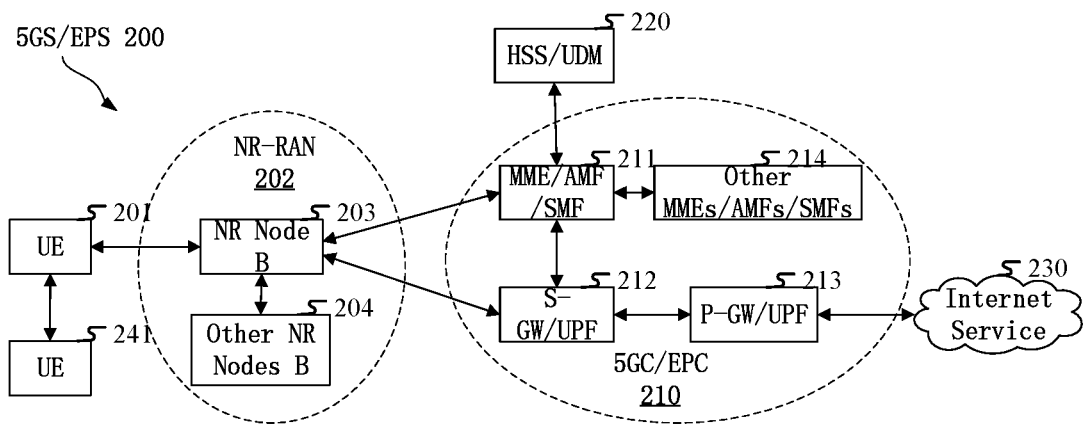
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present application comprises the UE 201.

In one embodiment, the second node in the present application comprises the UE 241.

In one embodiment, the UE in the present application comprises the UE 201.

In one embodiment, the UE in the present application comprises the UE 241.

In one embodiment, the UE 201 supports sidelink communications.

In one embodiment, the UE 241 supports sidelink communications.

In one embodiment, a transmitter of the first signaling in the present application comprises the UE 201.

In one embodiment, a receiver of the first signaling in the present application comprises the UE 241.

In one embodiment, a transmitter of the first reference signal in the present application comprises the UE 201.

In one embodiment, a receiver of the first reference signal in the present application comprises the UE 241.

In one embodiment, a transmitter of the second signal in the present application comprises the UE 201.

In one embodiment, a receiver of the second signal in the present application comprises the UE 241.

In one embodiment, a receiver of the second information in the present application comprises the UE 201.

In one embodiment, a receiver of the first information in the present application comprises the UE 241.

Embodiment 3

Figure 3:
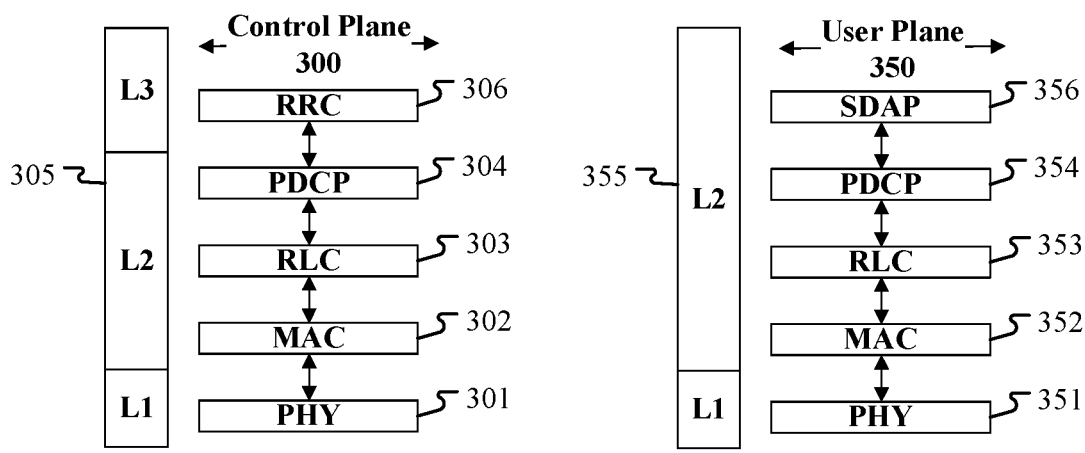
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the MAC sublayer 302.

In one embodiment, the first signaling in the present application is generated by the PHY 301.

In one embodiment, the first reference signal in the present application is generated by the PHY 301.

In one embodiment, the second signal in the present application is generated by the RRC sublayer 306.

In one embodiment, the second signal in the present application is transmitted to the PHY 301 via the MAC sublayer 302.

In one embodiment, the second signal in the present application is generated by the PHY 301.

In one embodiment, the second information in the present application is generated by the RRC sublayer 306.

In one embodiment, the second information in the present application is generated by the MAC sublayer 302.

In one embodiment, the second information in the present application is generated by the PHY 301.

Embodiment 4

Figure 4:
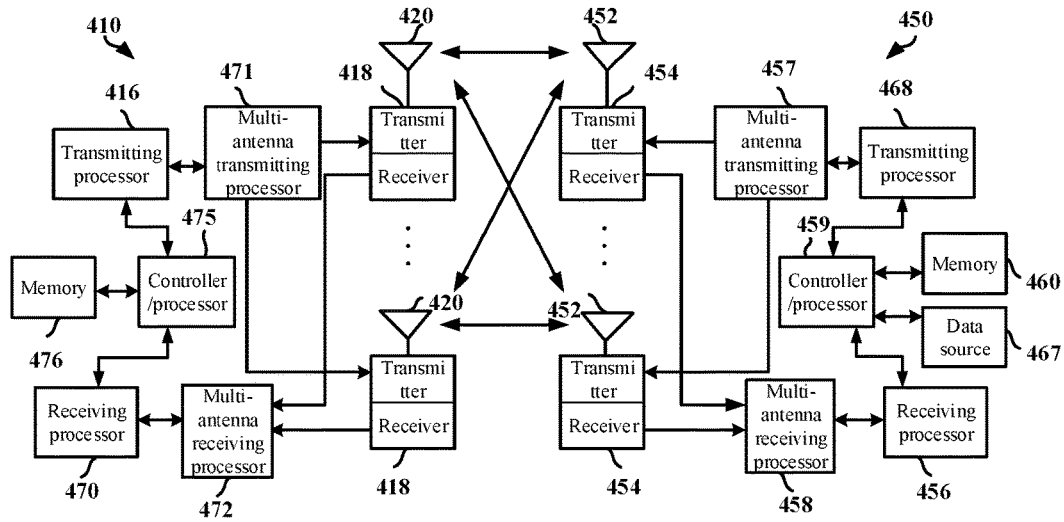
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: transmits a first signaling; and transmits a first reference signal and a second signal through a first antenna port in a first time-frequency resource set; the first signaling is used to indicate the first time-frequency resource set, and the first signaling is used to indicate a number of time-frequency resource(s) used for the first reference signal in the first time-frequency resource set; the first reference signal is used to demodulate the second signal; the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to indicate the first QCL relationship out of the Q candidate QCL relationships, Q being a positive integer greater than 1.

In one embodiment, the second communication device 450 comprises a memory that stores a computer readable instruction program. The computer readable instruction program generates an action when executed by at least one processor. The action includes: transmitting a first signaling; and transmitting a first reference signal and a second signal through a first antenna port in a first time-frequency resource set; the first signaling is used to indicate the first time-frequency resource set, and the first signaling is used to indicate a number of time-frequency resource(s) used for the first reference signal in the first time-frequency resource set; the first reference signal is used to demodulate the second signal; the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to indicate the first QCL relationship out of the Q candidate QCL relationships, Q being a positive integer greater than 1.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: receives a first signaling; and receives a first reference signal and a second signal in a first time-frequency resource set; the first signaling is used to determine the first time-frequency resource set, and the first signaling is used to determine a number of time-frequency resource(s) used for the first reference signal in the first time-frequency resource set; the first reference signal is used to demodulate the second signal; the first reference signal and the second signal is transmitted through a first antenna port, the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to determine the first QCL relationship out of the Q candidate QCL relationships, Q being a positive integer greater than 1.

In one embodiment, the first communication device 410 comprises a memory that stores a computer readable instruction program. The computer readable instruction program generates an action when executed by at least one processor. The action includes: receiving a first signaling; and receiving a first reference signal and a second signal in a first time-frequency resource set; the first signaling is used to determine the first time-frequency resource set, and the first signaling is used to determine a number of time-frequency resource(s) used for the first reference signal in the first time-frequency resource set; the first reference signal is used to demodulate the second signal; the first reference signal and the second signal is transmitted through a first antenna port, the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to determine the first QCL relationship out of the Q candidate QCL relationships, Q being a positive integer greater than 1.

In one embodiment, at least one of the antenna 452, the transmitter 454, the multi-antenna transmitting processor 458, the transmitting processor 468, the controller/processor 459, the memory 460, or the data sources 467 is used to transmit a first signaling in the present application.

In one embodiment, at least one of the antenna 452, the transmitter 454, the multi-antenna transmission processor 458, the transmitting processor 468, the controller/processor 459, the memory 460, or the data source 467 is used to transmit a first reference signal and a second signal through a first antenna port in a first time-frequency resource set in the present application.

In one embodiment, at least one of the antenna 452, the transmitter 454, the multi-antenna transmitting processor 458, the transmitting processor 468, the controller/processor 459, the memory 460, or the data sources 467 is used to transmit a first reference signal in the present application.

In one embodiment, at least one of the antenna 452, the transmitter 454, the multi-antenna transmitting processor 458, the transmitting processor 468, the controller/processor 459, the memory 460, or the data sources 467 is used to transmit a second signal in the present application.

In one embodiment, at least one of the antenna 452, the receiver 454, the multi-antenna receiving processor 458, the receiving processor 456, the controller/processor 459, the memory 460, or the data source 467 is used to receive second information in the present application.

In one embodiment, at least one of the antenna 420, the receiver 418, the multi-antenna receiving processor 472, the receiving processor 470, the controller/processor 475, or the memory 476 is used to receive a first signaling in the present application.

In one embodiment, at least one of the antenna 420, the receiver 418, the multi-antenna receiving processor 472, the receiving processor 470, the controller/processor 475, or the memory 476 is used to receive a first reference signal and a second signal in a first time-frequency resource set in the present application.

In one embodiment, at least one of the antenna 420, the receiver 418, the multi-antenna receiving processor 472, the receiving processor 470, the controller/processor 475, or the memory 476 is used to receive a first reference signal in the present application.

In one embodiment, at least one of the antenna 420, the receiver 418, the multi-antenna receiving processor 472, the receiving processor 470, the controller/processor 475, or the memory 476 is used to receive a second signal in the present application.

In one embodiment, at least one of the antenna 420, the receiver 418, the multi-antenna receiving processor 472, the receiving processor 470, the controller/processor 475, or the memory 476 is used to receive second information in the present application.

Embodiment 5

Figure 5:
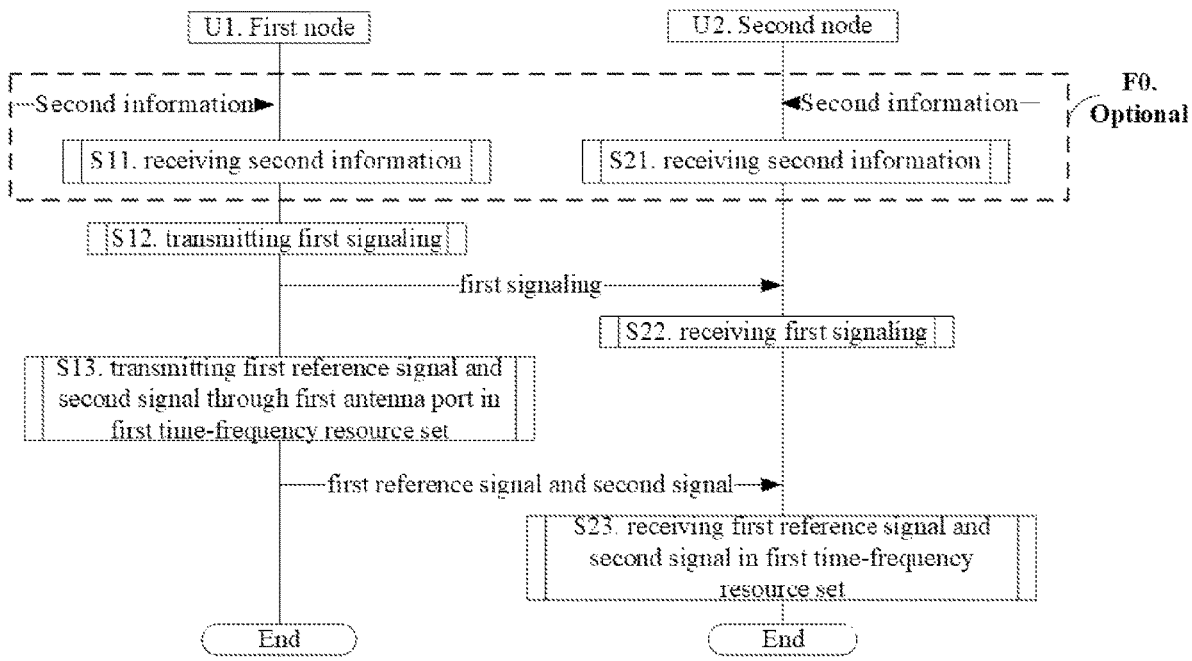
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a first node U1 and a second node U2 are in communications via an air interface, and steps in block F0 in FIG. 5 are optional.

The first node U1 transmits second information in step S11; transmits a first signaling in step S12; transmits a first reference signal and a second signal through a first antenna port in a first time-frequency resource set in step S13.

The second node U2 receives second information in step S21; receives a first signaling in step S22; receives a first reference signal and a second signal in a first time-frequency resource set in step S23.

In embodiment 5, the first signaling is used to indicate the first time-frequency resource set, and the first signaling is used to indicate a number of time-frequency resource(s) used for the first reference signal in the first time-frequency resource set; the first reference signal is used to demodulate the second signal; the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to indicate the first QCL relationship out of the Q candidate QCL relationships, Q being a positive integer greater than 1; when any of the Q candidate QCL relationships comprises a candidate reference signal, the first QCL relationship comprises a first candidate reference signal, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s); when any of the Q candidate QCL relationships comprises a QCL type, the first QCL relationship comprises a first QCL type, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s).

In one embodiment, the first signaling comprises first information, and the first information in the first signaling and the number of time-frequency resource(s) used for the first reference signal in the first time-frequency resource set are used together to determine the first QCL relationship out of the Q candidate QCL relationships.

In one embodiment, the first signaling comprises first information, the second information and the number of time-frequency resource(s) used for the first reference signal in the first time-frequency resource set are used together to determine Q0 candidate QCL relationship(s) out of the Q candidate QCL relationships, and the first information in the first signaling is used to determine the first QCL relationship out of the Q0 candidate QCL relationship(s).

In one embodiment, the first signaling comprises first information, and the first information in the first signaling is used to determine the first QCL relationship out of the Q candidate QCL relationships; the number of time-frequency resource(s) used for the first reference signal in the first time-frequency resource set is used to determine whether the first information is disabled.

In one embodiment, when Q is greater than a first threshold value, steps in block F0 in FIG. 5 exist, and the first threshold value is a positive integer.

In one embodiment, the first threshold value is 8.

In one embodiment, the first threshold value is predefined.

In one embodiment, the first threshold value is configurable.

In one embodiment, the first node U1 and the second node U2 are in communications via a PC5 interface.

Embodiment 6

Figure 6:
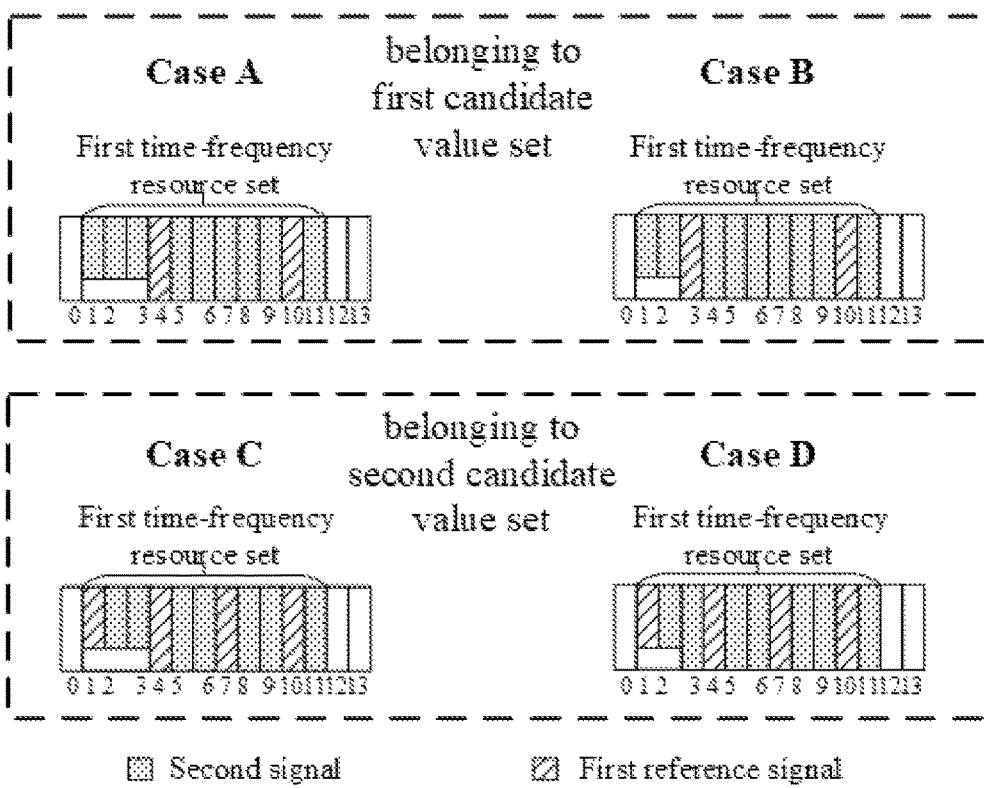
FIG. 6 illustrate a schematic diagram of relations among a first reference signal, a second signal and a first time-frequency resource set according to one embodiment of the present application.

Embodiment 6 illustrate a schematic diagram of relations among a first reference signal, a second signal and a first time-frequency resource set according to one embodiment of the present application, as shown in FIG. 6. In FIG. 6, the filled rectangle represents time-frequency resources comprised in a first time-frequency resource set in the present application; the dot-filled rectangle represents time-frequency resources used for the second signal in the first time-frequency resource set; the slash-filled rectangle represents time-frequency resources used for the first reference signal in the first time-frequency resource set.

In embodiment 6, the first time-frequency resource set comprises X0 time-frequency resource units, X0 being a positive integer greater than 1; in case A and case B of embodiment 6, the number of time-frequency resource(s) used for the first reference signal in the X0 time-frequency resource units of the first time-frequency resource set is a first candidate value; in case C and case D of embodiment 6, the number of time-frequency resource(s) used for the first reference signal in the X0 time-frequency resource units of the first time-frequency resource set is a second candidate value; the first candidate value and the second candidate value are positive integers less than the X0, and the first candidate value is less than the second candidate value.

In one embodiment, the number of time-frequency resource(s) used for the first reference signal in the X0 time-frequency resource units comprised in the first time-frequency resource set is one of the first candidate value or the second candidate value.

In one embodiment, the first candidate value is less than the second candidate value.

In one embodiment, the first candidate value is equal to 1, and the second candidate value is equal to 2.

In one embodiment, the first candidate value is equal to 1, and the second candidate value is equal to 3.

In one embodiment, the first candidate value is equal to 2, and the second candidate value is equal to 3.

In one embodiment, the first candidate value is equal to 2, and the second candidate value is equal to 4.

In one embodiment, the first candidate value is equal to 3, and the second candidate value is equal to 4.

In one embodiment, the first candidate value is equal to 8, and the second candidate value is equal to 12.

In one embodiment, the first candidate value is equal to 8, and the second candidate value is equal to 16.

In one embodiment, the first candidate value is equal to 12, and the second candidate value is equal to 16.

In one embodiment, the first candidate value belongs to a first candidate value set.

In one embodiment, the second candidate value belongs to a second candidate value set.

In one embodiment, the number of time-frequency resource(s) used for the first reference signal in the first time-frequency resource set belongs to a first candidate value set, or the number of time-frequency resource(s) used for the first reference signal in the first time-frequency resource set belongs to a second candidate value set.

In one embodiment, the number of time-frequency resource(s) used for the first reference signal in the first time-frequency resource set belongs to the first candidate value set.

In one embodiment, the number of time-frequency resource(s) used for the first reference signal in the first time-frequency resource set belongs to the second candidate value set.

In one embodiment, the first candidate value set comprises at least one positive integer.

In one embodiment, the second candidate value set comprises at least one positive integer.

In one embodiment, the first candidate value set comprises {1}, and the second candidate value set comprises {2, 3}.

In one embodiment, the first candidate value set comprises {1, 2}, and the second candidate value set comprises {3}.

In one embodiment, the first candidate value set comprises {1, 2}, and the second candidate value set comprises {3, 4}.

In one embodiment, the first candidate value set comprises {2}, and the second candidate value set comprises {3, 4}.

In one embodiment, the first candidate value set comprises {2, 3}, and the second candidate value set comprises {4}.

In one embodiment, the first candidate value set comprises {8}, and the second candidate value set comprises {12, 16}.

In one embodiment, the first candidate value set comprises {8, 12}, and the second candidate value set comprises {16}.

In one embodiment, the first candidate value set is pre-defined.

In one embodiment, the first candidate value set is configurable.

In one embodiment, the second candidate value set is pre-defined.

In one embodiment, the second candidate value set is configurable.

In one embodiment, the first time-frequency resource set comprises at least one time-frequency resource unit.

In one embodiment, the first time-frequency resource set comprises at least one time-domain resource unit.

In one embodiment, the first time-frequency resource set comprises at least one frequency-domain resource unit.

In one embodiment, the first time-frequency resource set comprises a plurality of REs.

In one embodiment, the first time-frequency resource set comprises at least one sub-channel.

In one embodiment, the first time-frequency resource comprises at least one PRB.

In one embodiment, the first time-frequency resource set comprises at least one subcarrier.

In one embodiment, the first time-frequency resource set comprises at least one sub-frame.

In one embodiment, the first time-frequency resource set comprises at least one slot.

In one embodiment, the first time-frequency resource set comprises at least one multicarrier symbol.

In one embodiment, the first time-frequency resource set belongs to a slot, and the slot comprises at least one multicarrier symbol.

In one subembodiment of the above embodiment, the slot comprises 14 multicarrier symbols.

In one embodiment, the first time-frequency resource set comprises at least one consecutive multicarrier symbol in a slot.

In one embodiment, the first time-frequency resource set comprises 12 consecutive multicarrier symbols in a slot.

In one embodiment, the first time-frequency resource set comprises 11 consecutive multicarrier symbols in a slot.

In one embodiment, the first time-frequency resource set comprises 10 consecutive multicarrier symbols in a slot.

In one embodiment, the first time-frequency resource set comprises 9 consecutive multicarrier symbols in a slot.

In one embodiment, the first time-frequency resource set comprises 8 consecutive multicarrier symbols in a slot.

In one embodiment, the first time-frequency resource set comprises 7 consecutive multicarrier symbols in a slot.

In one embodiment, the first time-frequency resource set comprises 6 consecutive multicarrier symbols in a slot.

In one embodiment, the first time-frequency resource set comprises 5 consecutive multicarrier symbols in a slot.

In one embodiment, the first time-frequency resource set starts from a second multicarrier symbol in the slot.

In one embodiment, the first time-frequency resource set comprises a PSSCH.

In one embodiment, the first time-frequency resource set comprises a PSSCH DMRS.

In one embodiment, the first time-frequency resource set comprises time-frequency resources occupied by a PSSCH DMRS.

In one embodiment, the first time-frequency resource set comprises a PSSCH and a PSSCH DMRS.

In one embodiment, the first time-frequency resource set comprises time-frequency resources occupied by a PSSCH and a PSSCH DMRS.

In one embodiment, the first time-frequency resource set comprises a PSCCH.

In one embodiment, the first time-frequency resource set does not comprise a PSCCH.

In one embodiment, the first time-frequency resource set does not comprise time-frequency resources occupied by an Automatic Gain Control (AGC).

In one embodiment, the first time-frequency resource set does not comprise a Physical Sidelink Feedback Channel (PSFCH).

In one embodiment, the first time-frequency resource set comprises a PDCCH.

In one embodiment, the first time-frequency resource set comprises a PDSCH.

In one embodiment, all multicarrier symbols in time-frequency resources comprised in a PSSCH belong to the first time-frequency resource set.

In one embodiment, all multicarrier symbols in time-frequency resources occupied by a PSSCH DMRS belong to the first time-frequency resource set.

In one embodiment, all REs in time-frequency resources comprised in a PSSCH belong to the first time-frequency resource set.

In one embodiment, all REs in time-frequency resources occupied by a PSSCH DMRS belong to the first time-frequency resource set.

Embodiment 7

Figure 7:
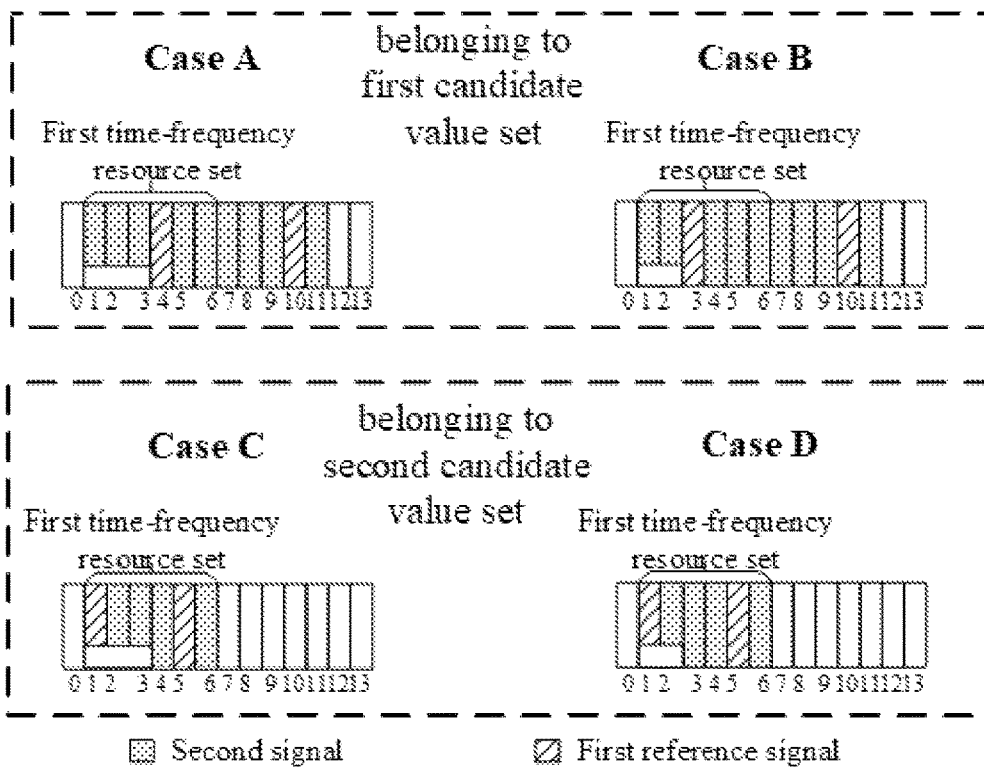
FIG. 7 illustrates a schematic diagram of a relation between a first reference signal and a second signal according to one embodiment of the present application.

Embodiment 7 illustrate a schematic diagram of relations among a first reference signal, a second signal and a first time-frequency resource set according to one embodiment of the present application, as shown in FIG. 7. In FIG. 7, the filled rectangle represents time-frequency resources used for the first reference signal and the second signal in the present application; the filled rectangle covered by the curly bracket represents time-frequency resources comprised in the first time-frequency resource set in the present application; the dot-filled rectangle covered by the curly bracket represents time-frequency resources used for the second signal in the first time-frequency resource set; and the slash-filled rectangle covered by the curly bracket represents time-frequency resources used for the first reference signal in the first time-frequency resource set.

In embodiment 7, the first time-frequency resource set comprises X0 time-frequency resource units, X0 being a positive integer greater than 1; in case A and case B of embodiment 7, the number of time-frequency resource(s) used for the first reference signal in the X0 time-frequency resource units of the first time-frequency resource set is a first candidate value, there exists time-frequency resources used for the first reference signal of at least one time-frequency resource unit not belonging to the first time-frequency resource set; in case C and case D of embodiment 7, the number of time-frequency resource(s) used for the first reference signal in the X0 time-frequency resource units of the first time-frequency resource set is a second candidate value, and time-frequency resources used for the first reference signal all belong to the first time-frequency resource set; the first candidate value and the second candidate value are positive integers less than the X0, and the first candidate value is less than the second candidate value.

In one embodiment, time-frequency resources used for the first reference signal belong to the first time-frequency resource set.

In one embodiment, time-frequency resources used for the first reference signal comprises P0 time-frequency resource unit(s), P0 being a positive integer, and each of P0 time-frequency resource unit(s) comprised used for the first reference signal in the time-frequency resources belongs to the first time-frequency resource set.

In one embodiment, time-frequency resources used for the first reference signal comprises P0 time-frequency resource unit(s), P0 being a positive integer, and at least one of P0 time-frequency resource unit(s) used for the first reference signal comprised in the time-frequency resources does not belong to the first time-frequency resource set.

In one embodiment, the first time-frequency resource set belongs to a PSSCH.

In one embodiment, the first time-frequency resource set belongs to a PSCCH.

In one embodiment, the first time-frequency resource set belongs to at least one of a PSCCH or a PSSCH.

In one embodiment, the first time-frequency resource set belongs to a PSCCH and a PSSCH.

In one embodiment, the first time-frequency resource set does not belong to a PSCCH.

In one embodiment, there exists a multicarrier symbol in time-frequency resources comprised in a PSSCH not belonging to the first time-frequency resource set.

In one embodiment, there exists a multicarrier symbol in time-frequency resources occupied by a PSSCH DMRS not belonging to the first time-frequency resource set.

In one embodiment, there exists an RE in time-frequency resources comprised in a PSSCH not belonging to the first time-frequency resource set.

In one embodiment, there exists an RE in time-frequency resources occupied by a PSSCH DMRS not belonging to the first time-frequency resource set.

Embodiment 8

Figure 8:
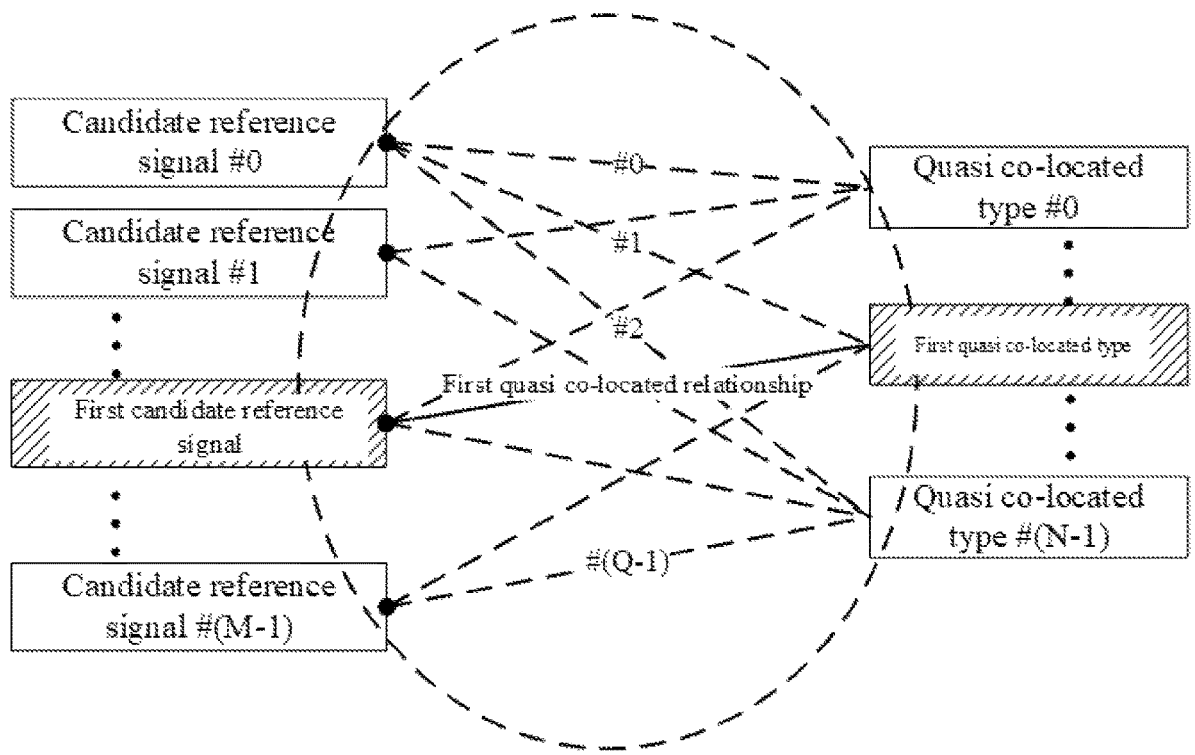
FIG. 8 illustrates a schematic diagram of a first QCL relationship, a first candidate reference signal and a first QCL type as well as Q candidate QCL relationships, a candidate reference signal and a QCL type according to one embodiment of the present application.

Embodiment 8 illustrates a schematic diagram of relations among a first QCL relationship, a first candidate reference signal and a first QCL type as well as Q candidate QCL relationships, a candidate reference signal and a QCL type according to one embodiment of the present application, as shown in FIG. 8. In FIG. 8, any dotted straight line represents one of Q candidate QCL relationships in the present application, the rectangle on the left of any dotted straight line represents a candidate reference signal, and the rectangle on the right of any dotted straight line represents a QCL type; a solid straight line in FIG. 8 represents a first QCL relationship in the present application, the slash-filled rectangle on the left of the solid straight line represents a first candidate reference signal, and the slash-filled rectangle on the right of the solid straight line represents a first QCL type.

In embodiment 8, any of the Q candidate QCL relationships comprises a candidate reference signal and a QCL type; the first QCL relationship is one of the Q candidate QCL relationships, and the first QCL relationship comprises a first candidate reference signal and a first QCL type; the number of time-frequency resource(s) used for the first reference signal in the first time-frequency resource set is used to indicate the first QCL relationship out of the Q candidate QCL relationships, Q being a positive integer greater than 1.

In one embodiment, the Q candidate QCL relationships comprise M candidate reference signal(s) and N QCL type(s).

In one embodiment, the first candidate reference signal is one of the M candidate reference signal(s) comprised in the Q candidate QCL relationships, and the first QCL type is one of the N QCL type(s) comprised in the Q candidate QCL relationships.

In one embodiment, a first candidate QCL relationship set comprises at least one candidate QCL relationship, and the at least one candidate QCL relationship comprised in the first candidate QCL relationship set belong to the Q candidate QCL relationships.

In one embodiment, the first candidate QCL relationship set comprises a candidate QCL relationship.

In one embodiment, a second candidate QCL relationship set comprises at least one candidate QCL relationship, the at least one candidate QCL relationship comprised in the second candidate QCL relationship set belongs to the Q candidate QCL relationships, and any candidate QCL relationship in the second candidate QCL relationship set does not belong to the first candidate QCL relationship set.

In one embodiment, the second candidate QCL relationship set comprises a candidate QCL relationship.

In one embodiment, the first candidate QCL relationship set is predefined.

In one embodiment, the first candidate QCL relationship set is configurable.

In one embodiment, the first candidate QCL relationship set is configured by a higher-layer signaling.

In one embodiment, the first candidate QCL relationship set is activated by a MAC-layer signaling.

In one embodiment, the second candidate QCL relationship set is predefined.

In one embodiment, the second candidate QCL relationship set is configurable.

In one embodiment, the second candidate QCL relationship set is configured by a higher-layer signaling.

In one embodiment, the second candidate QCL relationship set is activated by a MAC-layer signaling.

In one embodiment, the number of time-frequency resource(s) used for the first reference signal in the first time-frequency resource set is one of the first candidate value and the second candidate value; when the number of time-frequency resource(s) used for the first reference signal in the first time-frequency resource set is the first candidate value, the first QCL relationship belongs to the first candidate QCL relationship set; when the number of time-frequency resource(s) used for the first reference signal in the first time-frequency resource set is the second candidate value, the first QCL relationship belongs to the second candidate QCL relationship set.

In one embodiment, the number of time-frequency resource(s) used for the first reference signal in the first time-frequency resource set belongs to a first candidate value set, or the number of time-frequency resource(s) used for the first reference signal in the first time-frequency resource set belongs to a second candidate value set; when the number of time-frequency resource(s) used for the first reference signal in the first time-frequency resource set belongs to the first candidate value set, the first QCL relationship belongs to the first candidate QCL relationship set; when the number of time-frequency resource(s) used for the first reference signal in the first time-frequency resource set belongs to the second candidate value set, the first QCL relationship belongs to the second candidate QCL relationship set.

Embodiment 9

Figure 9:
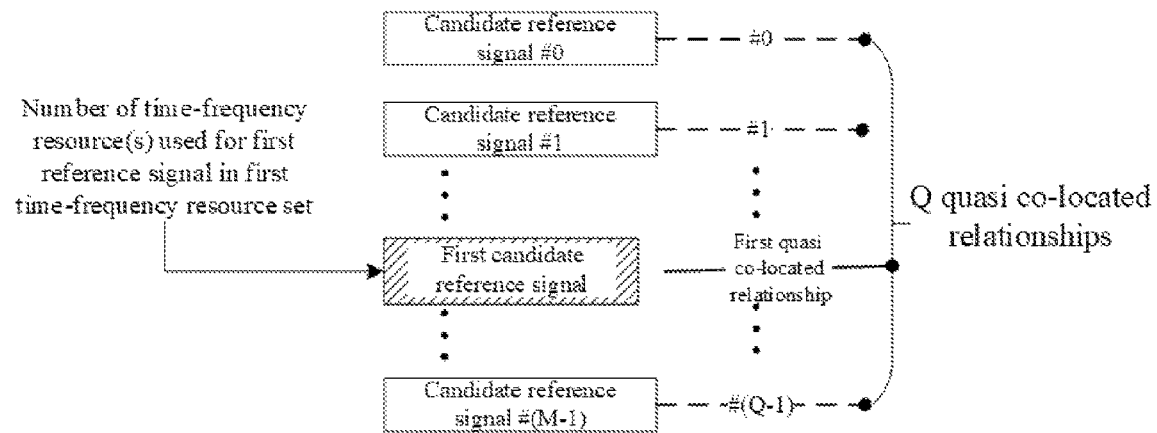
FIG. 9 illustrates a schematic diagram of relations among a first QCL relationship, a first candidate reference signal and M candidate reference signal(s) according to one embodiment of the present application.

Embodiment 9 illustrates a schematic diagram of relations among a first QCL relationship, a first candidate reference signal and M candidate reference signal(s) according to one embodiment of the present application, as shown in FIG. 9. In FIG. 9, any dotted straight line represents one of Q candidate QCL relationships in the present application, the rectangle on the left of any dotted straight line represents a candidate reference signal; a solid straight line in the FIG. 9 represents a first QCL relationship in the present application, the slash-filled rectangle on the left of the solid straight line represents a first candidate reference signal.

In embodiment 9, any of the Q candidate QCL relationships comprises a candidate reference signal, the first QCL relationship comprises a first candidate reference signal, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q.

In one embodiment, the Q candidate QCL relationships comprise M candidate reference signal(s); the first candidate reference signal is one of the M candidate reference signal(s) comprised in the Q QCL relationships.

In one embodiment, M is equal to the Q.

In one embodiment, a first candidate QCL relationship set comprises at least one candidate reference signal, and each of the at least one candidate reference signal comprised in the first candidate QCL relationship set belongs to the M candidate reference signal(s) in the Q candidate QCL relationships.

In one embodiment, the first candidate QCL relationship set comprises a candidate reference signal.

In one embodiment, a second candidate QCL relationship set comprises at least one candidate reference signal, each of the at least one candidate reference signal comprised in the second candidate QCL relationship set belongs to M candidate reference signal(s) in the Q candidate QCL relationships, and any candidate QCL relationship in the second candidate QCL relationship set does not belong to the first candidate QCL relationship set.

In one embodiment, the second candidate QCL relationship set comprises a candidate reference signal.

In one embodiment, the at least one candidate reference signal comprised in the first candidate QCL relationship set is pre-defined.

In one embodiment, the at least one candidate reference signal comprised in the first candidate QCL relationship set is configurable.

In one embodiment, the at least one candidate reference signal comprised in the first candidate QCL relationship set is configured by a higher-layer signaling.

In one embodiment, the at least one candidate reference signal comprised in the first candidate QCL relationship set is activated by a MAC layer signaling.

In one embodiment, the at least one candidate reference signal comprised in the second candidate QCL relationship set is pre-defined.

In one embodiment, the at least one candidate reference signal comprised in the second candidate QCL relationship set is configurable.

In one embodiment, the at least one candidate reference signal comprised in the second candidate QCL relationship set is configured by a higher-layer signaling.

In one embodiment, the at least one candidate reference signal comprised in the second candidate QCL relationship set is activated by a MAC layer signaling.

In one embodiment, the number of time-frequency resource(s) used for the first reference signal in the first time-frequency resource set is one of the first candidate value and the second candidate value; when the number of time-frequency resource(s) used for the first reference signal in the first time-frequency resource set is the first candidate value, the first candidate reference signal comprised in the first QCL relationship belongs to the at least one candidate reference signal comprised in the first candidate QCL relationship set; when the number of time-frequency resource(s) used for the first reference signal in the first time-frequency resource set is the second candidate value, the first candidate reference signal comprised in the first QCL relationship belongs to the at least one candidate reference signal comprised in the second candidate QCL relationship set.

In one embodiment, the number of time-frequency resource(s) used for the first reference signal in the first time-frequency resource set belongs to a first candidate value set, or the number of time-frequency resource(s) used for the first reference signal in the first time-frequency resource set belongs to a second candidate value set; when the number of time-frequency resource(s) used for the first reference signal in the first time-frequency resource set belongs to the first candidate value set, the first candidate reference signal comprised in the first QCL relationship belongs to the at least one candidate reference signal comprised in the first candidate QCL relationship set; when the number of time-frequency resource(s) used for the first reference signal in the first time-frequency resource set belongs to the second candidate value set, the first candidate reference signal comprised in the first QCL relationship belongs to the at least one candidate reference signal comprised in the second candidate QCL relationship set.

In one embodiment, the first antenna port and the first candidate reference signal being QCL refers to: a channel over which the first candidate reference signal is conveyed can be used to infer large-scale properties of a channel over which the first reference signal transmitted by the first antenna port is conveyed.

In one embodiment, the first antenna port and the first candidate reference signal being QCL refers to: a channel over which the first candidate reference signal is conveyed is used to infer large-scale properties of a channel over which the first reference signal transmitted by the first antenna port is conveyed.

Embodiment 10

Figure 10:
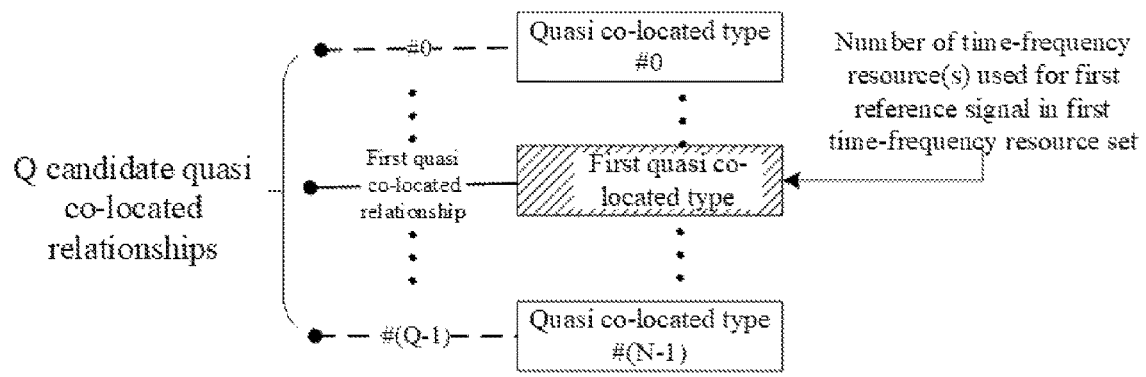
FIG. 10 illustrates a schematic diagram of relations among a first QCL relationship, a first QCL type and N QCL type(s) according to one embodiment of the present application.

Embodiment 10 illustrates a schematic diagram of relations among a first QCL relationship, a first QCL type and N QCL type(s) according to one embodiment of the present application, as shown in FIG. 10. In FIG. 10, any dotted straight line represents one of Q candidate QCL relationships in the present application, the rectangle on the right of any dotted straight line represents a QCL type; a solid straight line in FIG. 10 represents a first QCL relationship in the present application, the slash-filled rectangle on the right of the solid straight line represents a first QCL type.

In embodiment 10, any of the Q candidate QCL relationships comprises a QCL type, the first QCL relationship comprises a first QCL type, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q.

In one embodiment, the Q candidate QCL relationships comprise N QCL type(s); the first QCL type is one of the N QCL type(s) comprised in the Q candidate QCL relationships.

In one embodiment, N is equal to the Q.

In one embodiment, a first candidate QCL relationship set comprises at least one QCL type, and the at least one QCL type comprised in the first candidate QCL relationship set belongs to the N QCL type(s) in the Q candidate QCL relationships.

In one embodiment, the first candidate QCL relationship set comprises a QCL type.

In one embodiment, the QCL type comprised in the first candidate QCL relationship set is the fifth type.

In one embodiment, the QCL type comprised in the first candidate QCL relationship set is the sixth type.

In one embodiment, a second candidate QCL relationship set comprises at least one QCL type, each of the at least one QCL type comprised in the second candidate QCL relationship set belongs to the N QCL type(s) in the Q candidate QCL relationships, and any candidate QCL relationship in the second candidate QCL relationship set does not belong to the first candidate QCL relationship set.

In one embodiment, the second candidate QCL relationship set comprises a QCL type.

In one embodiment, the QCL type comprised in the first candidate QCL relationship set is the fifth type, and the QCL type comprised in the second candidate QCL relationship set is the sixth type.

In one embodiment, the QCL type comprised in the first candidate QCL relationship set is the sixth type, and the QCL type comprised in the second candidate QCL relationship set is the fifth type.

In one embodiment, the QCL type comprised in the first candidate QCL relationship set is 'QCL', and the QCL type comprised in the second candidate QCL relationship set is 'non-QCL'.

In one embodiment, the QCL type comprised in the first candidate QCL relationship set is 'non-QCL', and the QCL type comprised in the second candidate QCL relationship set is 'QCL'.

In one embodiment, the at least one QCL type comprised in the first candidate QCL relationship set is pre-defined.

In one embodiment, the at least one QCL type comprised in the first candidate QCL relationship set is configurable.

In one embodiment, the at least one QCL type comprised in the first candidate QCL relationship set is configured by a higher-layer signaling.

In one embodiment, the at least one QCL type comprised in the first candidate QCL relationship set is activated by a MAC-layer signaling.

In one embodiment, the at least one QCL type comprised in the second candidate QCL relationship set is pre-defined.

In one embodiment, the at least one QCL type comprised in the second candidate QCL relationship set is configurable.

In one embodiment, the at least one QCL type comprised in the second candidate QCL relationship set is configured by a higher-layer signaling.

In one embodiment, the at least one QCL type comprised in the second candidate QCL relationship set is activated by a MAC-layer signaling.

In one embodiment, the number of time-frequency resource(s) used for the first reference signal in the first time-frequency resource set is one of the first candidate value and the second candidate value; when the number of time-frequency resource(s) used for the first reference signal in the first time-frequency resource set is the first candidate value, the first QCL type comprised in the first QCL relationship belongs to the at least one QCL type comprised in the first candidate QCL relationship set; when the number of time-frequency resource(s) used for the first reference signal in the first time-frequency resource set is the second candidate value, the first QCL type comprised in the first QCL relationship belongs to the at least one QCL type comprised in the second candidate QCL relationship set.

In one embodiment, the number of time-frequency resource(s) used for the first reference signal in the first time-frequency resource set belongs to a first candidate value set, or the number of time-frequency resource(s) used for the first reference signal in the first time-frequency resource set belongs to a second candidate value set; when the number of time-frequency resource(s) used for the first reference signal in the first time-frequency resource set belongs to the first candidate value set, the first QCL type comprised in the first QCL relationship belongs to the at least one QCL type comprised in the first candidate QCL relationship set; when the number of time-frequency resource(s) used for the first reference signal in the first time-frequency resource set belongs to the second candidate value set, the first QCL type comprised in the first QCL relationship belongs to the at least one QCL type comprised in the second candidate QCL relationship set.

Embodiment 11

Figure 11:
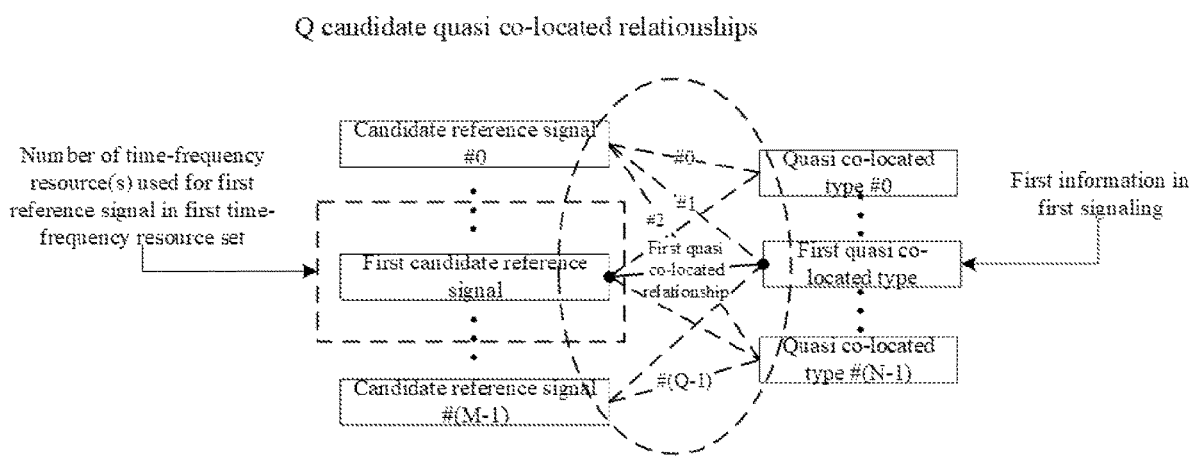
FIG. 11 illustrates a schematic diagram of relations among first information in a first signaling, a number of time-frequency resource(s) used for a first reference signal in a first time-frequency resource set and a first QCL relationship according to one embodiment of the present application.

Embodiment 11 illustrates a schematic diagram of relations among first information in a first signaling, a number of time-frequency resource(s) used for a first reference signal in a first time-frequency resource set and a first QCL relationship according to one embodiment of the present application, as shown in FIG. 11.

In embodiment 11, the first signaling comprises first information, and the first information in the first signaling and the number of time-frequency resource(s) used for the first reference signal in the first time-frequency resource set are used together to determine the first QCL relationship out of the Q candidate QCL relationships.

In one embodiment, the first information is one of a plurality of fields comprised in the first signaling.

In one embodiment, C1 bit(s) in C0 bit(s) comprised in the first signaling is(are) used to carry the first information, C0 being a positive integer, C1 being a positive integer not greater than the C0.

In one embodiment, C1 bit(s) in C0 bit(s) comprised in the first signaling is(are) used to indicate the first information, C0 being a positive integer, C1 being a positive integer not greater than the C0.

In one embodiment, the first information in the first signaling comprises C1 bit(s), C1 being a positive integer.

In one embodiment, C0 is equal to 3.

In one embodiment, C0 is equal to 0.

In one embodiment, the first information in the first signaling comprises a TCI.

In one embodiment, the first information in the first signaling is used to indicate the first QCL relationship out of the Q candidate QCL relationships.

In one embodiment, the first information in the first signaling is used to determine the first QCL relationship out of the Q candidate QCL relationships.

In one embodiment, the first information in the first signaling is used to determine the first candidate reference signal out of the M candidate reference signal(s).

In one embodiment, the first information in the first signaling is used to determine the first QCL type out of the N QCL type(s).

In one embodiment, the number of time-frequency resource(s) used for the first reference signal in the first time-frequency resource set is used to determine the first candidate reference signal out of the M candidate reference signal(s).

In one embodiment, the number of time-frequency resource(s) used for the first reference signal in the first time-frequency resource set is used to determine the first QCL type out of the N QCL type(s).

In one embodiment, the first information in the first signaling is used to determine the first candidate reference signal in the first QCL relationship, and the number of time-frequency resource(s) used for the first reference signal in the first time-frequency resource set is used to determine the first QCL type in the first QCL relationship.

In one embodiment, the first information in the first signaling is used to determine the first QCL type in the first QCL relationship, and the number of time-frequency resource(s) used for the first reference signal in the first time-frequency resource set is used to determine the first candidate reference signal in the first QCL relationship.

In one embodiment, the number of time-frequency resource(s) used for the first reference signal in the first time-frequency resource set is used to determine M0 candidate reference signal(s) out of the M candidate reference signal(s), and the M0 candidate reference signal(s) is(are) used to determine the Q1 candidate QCL relationship(s) out of the Q candidate QCL relationships; M0 is a positive integer not greater the M, Q1 is a positive integer not greater than the Q.

In one embodiment, the number of time-frequency resource(s) used for the first reference signal in the first time-frequency resource set is used to determine M0 candidate reference signal(s) out of the M candidate reference signal(s), and the M0 candidate reference signal(s) is(are) used to determine the Q1 candidate QCL relationship(s) out of the Q candidate QCL relationships; the first information in the first signaling is used to determine the first QCL relationship out of the Q1 candidate QCL relationship(s); M0 is a positive integer not greater than the M, and Q1 is a positive integer not greater than the Q.

In one embodiment, the number of time-frequency resource(s) used for the first reference signal in the first time-frequency resource set is used to determine N0 QCL type(s) out of the N QCL type(s), and the N0 QCL type(s) is(are) used to determine the Q2 candidate QCL relationship(s) out of the Q candidate QCL relationships; M0 is a positive integer not greater than the M, the Q2 is a positive integer not greater than the Q.

In one embodiment, the number of time-frequency resource(s) used for the first reference signal in the first time-frequency resource set is used to determine N0 QCL type(s) out of the N QCL type(s), and the NO QCL type(s) is(are) used to determine the Q2 candidate QCL relationship(s) out of the Q candidate QCL relationships; the first information in the first signaling is used to determine the first QCL relationship out of the Q2 candidate QCL relationship(s); N0 is a positive integer not greater than the N, and Q2 is a positive integer not greater than the Q.

In one embodiment, any of K0 candidate reference signal set(s) comprises at least one candidate reference signal, a first candidate reference signal set is one of the K0 candidate reference signal set(s), and the first candidate reference signal is one of at least one candidate reference signal comprised in the first candidate reference signal set.

In one embodiment, the first information in the first signaling is used to determine the first candidate reference signal set out of the K0 candidate reference signal set(s).

In one embodiment, the first information in the first signaling is used to determine the first candidate reference signal set out of the K0 candidate reference signal set(s); the number of time-frequency resource(s) used for the first reference signal in the first time-frequency resource set is used to determine the first candidate reference signal out of the first candidate reference signal set.

In one embodiment, the number of time-frequency resource(s) used for the first reference signal in the first time-frequency resource set is used to determine M1 candidate reference signals, M1 being a positive integer greater than 1; the first information in the first signaling indicates the first candidate reference signal out of the M1 candidate reference signal(s), M1 being a positive integer.

Embodiment 12

Figure 12:
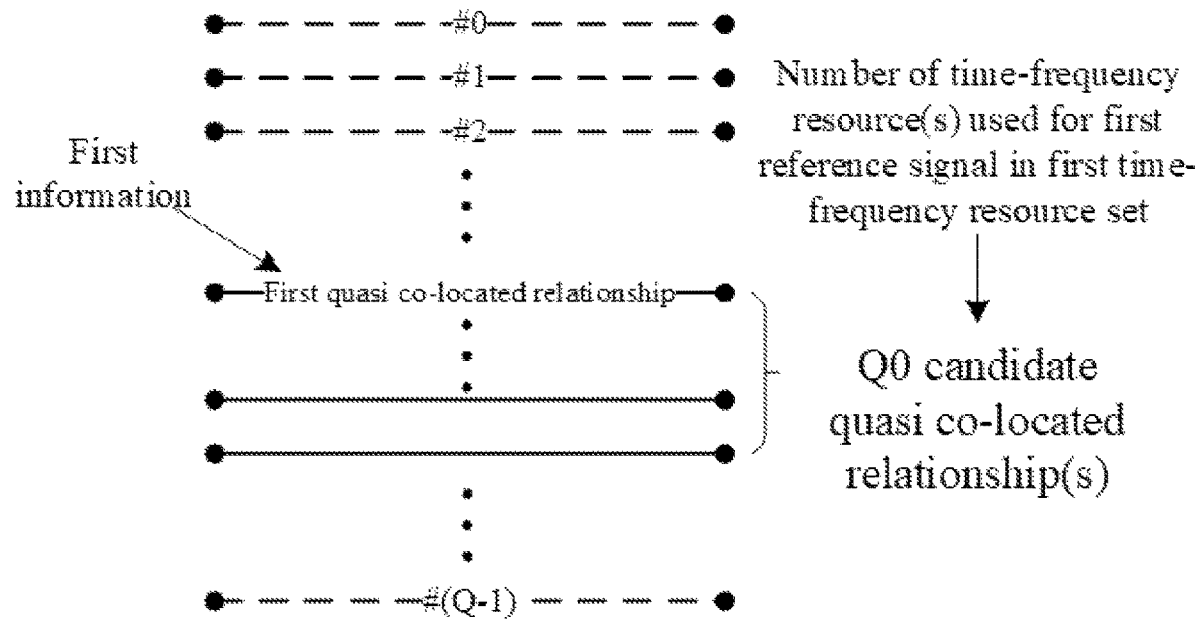
FIG. 12 illustrates a schematic diagram of relations among first information in a first signaling, a number of time-frequency resource(s) used for a first reference signal in a first time-frequency resource set and a first QCL relationship according to one embodiment of the present application.

Embodiment 12 illustrates a schematic diagram of relations among first information in a first signaling, a number of time-frequency resource(s) used for a first reference signal in a first time-frequency resource set and a first QCL relationship according to one embodiment of the present application, as shown in FIG. 12. In FIG. 12, each straight line represents one of the Q candidate QCL relationships; each solid line represents one of the Q0 candidate QCL relationship(s) in the present application.

In embodiment 12, the second information in the present application and the number of time-frequency resource(s) used for the first reference signal in the first time-frequency resource set are used together to determine Q0 candidate QCL relationship(s) out of the Q candidate QCL relationships, and the first information in the first signaling is used to determine the first QCL relationship out of the Q0 candidate QCL relationship(s).

In one embodiment, the second information is used to determine the Q candidate QCL relationships, and the number of time-frequency resource(s) used for the first reference signal in the first time-frequency resource set is used to determine Q0 candidate QCL relationship(s) out of the Q candidate QCL relationships.

In one embodiment, the second information is used to determine the first candidate QCL relationship set and the second candidate QCL relationship set, and both the first candidate QCL relationship set and the second candidate QCL relationship set belong to the Q candidate QCL relationships; when the number of time-frequency resource(s) of the first reference signal is the first candidate value, the Q0 candidate QCL relationship(s) belongs(belong) to the first candidate QCL relationship set; when the number of time-frequency resource(s) of the first reference signal is the second candidate value, the Q0 candidate QCL relationship(s) belongs(belong) to the second candidate QCL relationship set.

In one embodiment, the second information is used to determine the first candidate QCL relationship set and the second candidate QCL relationship set, and both the first candidate QCL relationship set and the second candidate QCL relationship set belong to the Q candidate QCL relationships; when the number of time-frequency resource(s) of the first reference signal is the first candidate value, the Q0 candidate QCL relationship(s) belongs(belong) to the first candidate QCL relationship set; when the number of time-frequency resource(s) of the first reference signal is the second candidate value, the Q0 candidate QCL relationship(s) belongs(belong) to the second candidate QCL relationship set; the first information in the first signaling is used to determine the first QCL relationship out of the Q0 candidate QCL relationship(s).

Embodiment 13

Figure 13:
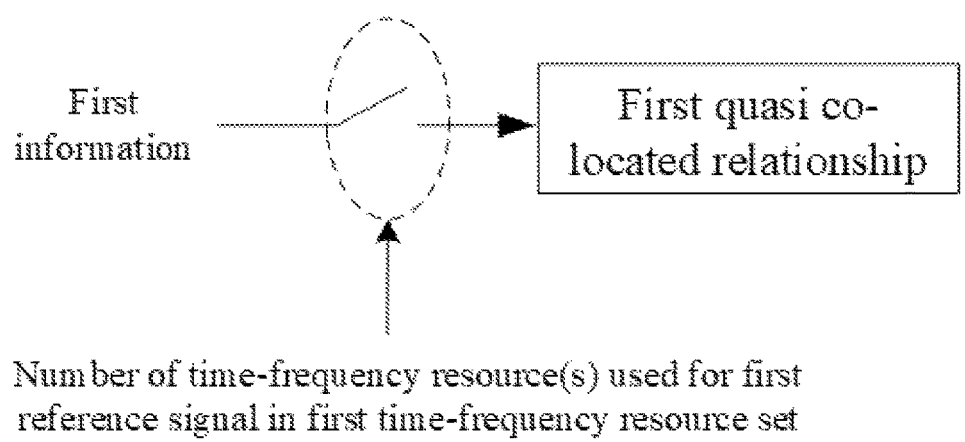
FIG. 13 illustrates a schematic diagram of relations among first information in a first signaling, a number of time-frequency resource(s) used for a first reference signal in a first time-frequency resource set and a first QCL relationship according to one embodiment of the present application.

Embodiment 13 illustrates a schematic diagram of relations among first information in a first signaling, a number of time-frequency resource(s) used for a first reference signal in a first time-frequency resource set and a first QCL relationship according to one embodiment of the present application, as shown in FIG. 13. In FIG. 13, the straight line represents the first QCL relationship; the switch on the straight line represents whether the first information in the present application is disabled.

In embodiment 13, the first signaling comprises first information, and the first information in the first signaling is used to determine the first QCL relationship out of the Q candidate QCL relationships; the number of time-frequency resource(s) used for the first reference signal in the first time-frequency resource set is used to determine whether the first information in the first signaling is disabled.

In one embodiment, the number of time-frequency resource(s) used for the first reference signal in the first time-frequency resource set is used to determine whether the first information in the first signaling is disabled.

In one embodiment, the number of time-frequency resource(s) used for the first reference signal in the first time-frequency resource set is used to determine that the first information in the first signaling is not disabled.

In one embodiment, the first information in the first signaling being disabled refers to that the first QCL type in the first QCL relationship is the sixth type.

In one embodiment, the first information in the first signaling being disabled refers to that the first QCL type in the first QCL relationship is 'non-QCL'.

In one embodiment, the first information in the first signaling being disabled refers to that the first QCL relationship determined by the first information in the first signaling is invalid.

In one embodiment, the first information in the first signaling being disabled refers to that the first antenna port conforms to a default QCL relationship.

In one embodiment, the first information in the first signaling being not disabled refers to that the first QCL type in the first QCL relationship is the fifth type.

In one embodiment, the first information in the first signaling being not disabled refers to that the first QCL type in the first QCL relationship is 'QCL'.

In one embodiment, the first information in the first signaling being not disabled refers to that the first QCL relationship determined by the first information in the first signaling is valid.

In one embodiment, the first information in the first signaling being not disabled refers to that the first antenna port conforms to the first QCL relationship determined by the first information in the first signaling.

In one embodiment, when the number of time-frequency resource(s) used for the first reference signal in the first time-frequency resource set is the first candidate value, the first information in the first signaling is not disabled; when the number of time-frequency resource(s) used for the first reference signal in the first time-frequency resource set is the second candidate value, the first information in the first signaling is disabled.

In one embodiment, when the number of time-frequency resource(s) used for the first reference signal in the first time-frequency resource set is the first candidate value, the first information in the first signaling is disabled; when the number of time-frequency resource(s) used for the first reference signal in the first time-frequency resource set is the second candidate value, the first information in the first signaling is not disabled.

Embodiment 14

Figure 14:
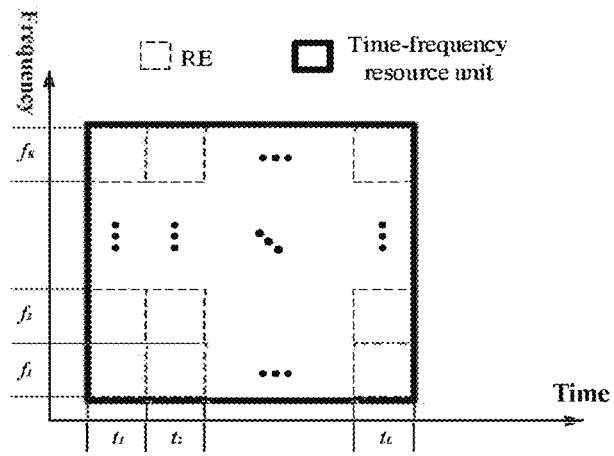
FIG. 14 illustrates a schematic diagram of a time-frequency resource unit according to one embodiment of the present application.

Embodiment 14 illustrates a schematic diagram of a time-frequency resource unit according to one embodiment of the present application, as shown in FIG. 14. In FIG. 14, a dotted box represents an RE, and a thick-line box represents a time-frequency resource unit. In FIG. 14, a time-frequency resource unit occupies K subcarrier(s) in frequency domain, and L multicarrier symbol(s) in time domain, K and L being positive integers. In FIG. 14, $t_1$, $t_2$, ..., $t_L$, represent(s) the L symbol(s), and $f_1, f_2, \ldots, f_K$ represent(s) the K subcarrier(s).

In Embodiment 13, a time-frequency resource unit occupies the K subcarrier(s) in frequency domain and the L multicarrier symbol(s) in time domain, K and L being positive integers.

In one embodiment, K is equal to 12.
In one embodiment, K is equal to 72.
In one embodiment, K is equal to 127.
In one embodiment, K is equal to 240.
In one embodiment, L is equal to 1.
In one embodiment, L is equal to 2.
In one embodiment, L is not greater than 14.
In one embodiment, any of the L multicarrier symbol(s) is an OFDM symbol.
In one embodiment, any of the L multicarrier symbol(s) is an SC-FDMA symbol.
In one embodiment, any of the L multicarrier symbol(s) is a DFT-S-OFDM symbol.

In one embodiment, any of the L multicarrier symbol(s) is a Frequency Division Multiple Access (FDMA) symbol.

In one embodiment, any of the L multicarrier symbol(s) is a Filter Bank Multicarrier (FBMC) symbol.

In one embodiment, any of the L multicarrier symbol(s) is an Interleaved Frequency Division Multiple Access (IFDMA) symbol.

In one embodiment, the time-domain resource unit comprises at least one radio frame.

In one embodiment, the time-domain resource unit comprises at least one subframe.

In one embodiment, the time-domain resource unit comprises at least one slot.

In one embodiment, the time-domain resource unit is a slot.

In one embodiment, the time-domain resource unit comprises at least one multicarrier symbol.

In one embodiment, the frequency-domain resource unit comprises at least one carrier.

In one embodiment, the frequency-domain resource unit comprises at least one Bandwidth Part (BWP).

In one embodiment, the frequency-domain resource unit is a BWP.

In one embodiment, the frequency-domain resource unit comprises at least one sub-channel.

In one embodiment, the frequency-domain resource unit is a sub-channel.

In one embodiment, any of the at least one sub-channel comprises at least one Resource Block (RB).

In one embodiment, the sub-channel comprises at least one RB.

In one embodiment, any of the at least one RB comprises at least one sub-carrier in frequency domain.

In one embodiment, any of the at least one RB comprises 12 sub-carriers in frequency domain.

In one embodiment, the sub-channel comprises at least one PRB.

In one embodiment, a number of PRB(s) comprised in the sub-channel is variable.

In one embodiment, any of the at least one PRB comprises at least one sub-carrier in frequency domain.

In one embodiment, any of the at least one PRB comprises 12 sub-carriers in frequency domain.

In one embodiment, the frequency-domain resource unit comprises at least one RB.

In one embodiment, the frequency-domain resource unit is an RB.

In one embodiment, the frequency-domain resource unit comprises at least one PRB.

In one embodiment, the frequency-domain resource unit is an PRB.

In one embodiment, the frequency-domain resource unit comprises at least one subcarrier.

In one embodiment, the frequency-domain resource unit is a subcarrier.

In one embodiment, the time-frequency resource unit comprises the time-domain resource unit.

In one embodiment, the time-frequency resource unit comprises the frequency-domain resource unit.

In one embodiment, the time-frequency resource unit comprises the time-domain resource unit and the frequency-domain resource unit.

In one embodiment, the time-frequency resource unit comprises R RE(s), R being a positive integer.

In one embodiment, the time-frequency resource unit consists of R RE(s), R being a positive integer.

In one embodiment, any of the R RE(s) occupies a multicarrier symbol in time domain and a subcarrier in frequency domain.

In one embodiment, the Subcarrier Spacing (SCS) is measured by Hertz (Hz).

In one embodiment, the SCS is measured by Kilohertz (kHz).

In one embodiment, the SCS is measured by Megahertz (MHz).

In one embodiment, a symbol length of the multicarrier symbol is measured by sampling point.

In one embodiment, a symbol length of the multicarrier symbol is measured by microsecond (µs).

In one embodiment, a symbol length of the multicarrier symbol is measured by millisecond (ms).

In one embodiment, the SCS is at least one of 1.25 kHz, 2.5 kHz, 5 kHz, 15 kHz, 30 kHz, 60 kHz, 120 kHz or 240 kHz.

In one embodiment, the time-frequency resource unit comprises the K subcarrier(s) and the L multicarrier symbol(s), and a product of K and L is not less than the R.

In one embodiment, the time-frequency resource unit does not comprise an RE allocated to a Guard Period (GP).

In one embodiment, the time-frequency resource unit does not comprise a RE allocated to a Reference Signal (RS).

In one embodiment, the time-frequency resource unit comprises at least one RB.

In one embodiment, the time-frequency resource unit belongs to an RB.

In one embodiment, the time-frequency resource unit is equal to an RB in frequency domain.

In one embodiment, the time-frequency resource unit comprises 6 RBs in frequency domain.

In one embodiment, the time-frequency resource unit comprises 20 RBs in frequency domain.

In one embodiment, the time-frequency resource unit comprises at least one PRB.

In one embodiment, the time-frequency resource unit belongs to a PRB.

In one embodiment, the time-frequency resource unit is equal to a PRB in frequency domain.

In one embodiment, the time-frequency resource unit comprises at least one Virtual Resource Block (VRB).

In one embodiment, the time-frequency resource unit belongs to a VRB.

In one embodiment, the time-frequency resource unit is equal to a VRB in frequency domain.

In one embodiment, the time-frequency resource unit comprises at least one PRB pair In one embodiment, the time-frequency resource unit belongs to a PRB pair.

In one embodiment, the time-frequency resource unit is equal to a PRB pair in frequency domain.

In one embodiment, the time-frequency resource unit comprises at least one radio frame.

In one embodiment, the time-frequency resource unit belongs to a radio frame.

In one embodiment, the time-frequency resource unit is equal to a radio frame in time domain.

In one embodiment, the time-frequency resource unit comprises at least one subframe.

In one embodiment, the time-frequency resource unit belongs to a subframe.

In one embodiment, the time-frequency resource unit is equal to a subframe in time domain.

In one embodiment, the time-frequency resource unit comprises at least one slot.

In one embodiment, the time-frequency resource unit belongs to a slot.

In one embodiment, the time-frequency resource unit is equal to a slot in time domain.

In one embodiment, the time-frequency resource unit comprises at least one Symbol.

In one embodiment, the time-frequency resource unit belongs to a Symbol.

In one embodiment, the time-frequency resource unit is equal to a Symbol in time domain.

In one embodiment, a duration of the time-domain resource unit in the present application is equal to a duration of the time-frequency resource unit in time domain in the present application.

In one embodiment, a number of multicarrier symbol(s) occupied by the time-frequency resource unit in the present application in time domain is equal to a number of multicarrier symbol(s) occupied by the time-domain resource unit in the present application in time domain.

In one embodiment, a number of subcarrier(s) occupied by the frequency-domain resource unit in the present application is equal to a number of subcarrier(s) of the time-frequency resource unit in the present application in frequency domain.

Embodiment 15

Figure 15:
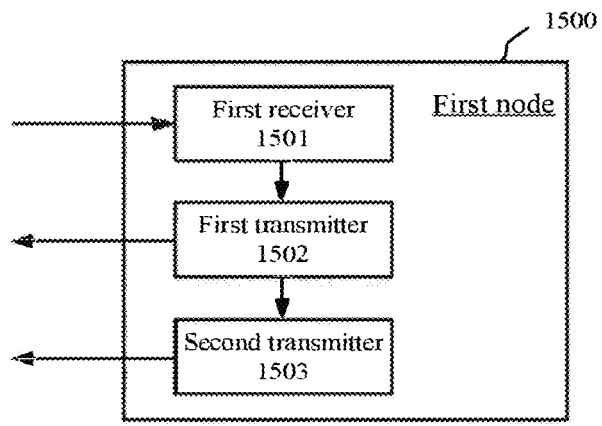
FIG. 15 illustrates a structure block diagram of a processing device in a first node according to one embodiment of the present application.

Embodiment 15 illustrates a structure block diagram of a processing device used in a first node, as shown in FIG. 15. In Embodiment 15, a processing device 1500 in a first node mainly consists of a first receiver 1501, a first transmitter 1502 and a second transmitter 1503.

In one embodiment, the first receiver 1501 comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the first transmitter 1502 comprises at least one of the antenna 452, the transmitter/receiver 454, the multi-antenna transmitting processor 457, the transmitting processor 468, the controller/processor 459, the memory 460, or the data source 467 in FIG. 4 of the present application.

In one embodiment, the second transmitter 1503 comprises at least one of the antenna 452, the transmitter/receiver 454, the multi-antenna transmitting processor 457, the transmitting processor 468, the controller/processor 459, the memory 460, or the data source 467 in FIG. 4 of the present application.

In embodiment 15, the first transmitter 1502 transmits a first signaling; the second transmitter 1503 transmits a first reference signal and a second signal through a first antenna port in a first time-frequency resource set; the first signaling is used to indicate the first time-frequency resource set, and the first signaling is used to indicate a number of time-frequency resource(s) used for the first reference signal in the first time-frequency resource set; the first reference signal is used to demodulate the second signal; the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to indicate the first QCL relationship out of the Q candidate QCL relationships, Q being a positive integer greater than 1.

In one embodiment, any of the Q candidate QCL relationships comprises a candidate reference signal, the first QCL relationship comprises a first candidate reference signal, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q.

In one embodiment, any of the Q candidate QCL relationships comprises a QCL type, the first QCL relationship comprises a first QCL type, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q.

In one embodiment, the first signaling comprises first information, and the first information in the first signaling and the number of time-frequency resource(s) used for the first reference signal in the first time-frequency resource set are used together to determine the first QCL relationship out of the Q candidate QCL relationships.

In one embodiment, the first receiver 1501 receives second information; the second information and the number of time-frequency resource(s) used for the first reference signal in the first time-frequency resource set are used together to determine Q0 candidate QCL relationship(s) out of the Q candidate QCL relationships, and the first information is used to determine the first QCL relationship out of the Q0 candidate QCL relationship(s).

In one embodiment, the first signaling comprises first information, and the first information in the first signaling is used to determine the first QCL relationship out of the Q candidate QCL relationships; the number of time-frequency resource(s) used for the first reference signal in the first time-frequency resource set is used to determine whether the first information is disabled.

In one embodiment, the first node 1500 is a UE.

In one embodiment, the first node 1500 is a relay node.

In one embodiment, the first node 1500 is a base station.

In one embodiment, the first node 1500 is a vehicle-mounted communication device.

In one embodiment, the first node 1500 is a UE supporting V2X communications.

In one embodiment, the first node 1500 is a relay node supporting V2X communications.

Embodiment 16

Figure 16:
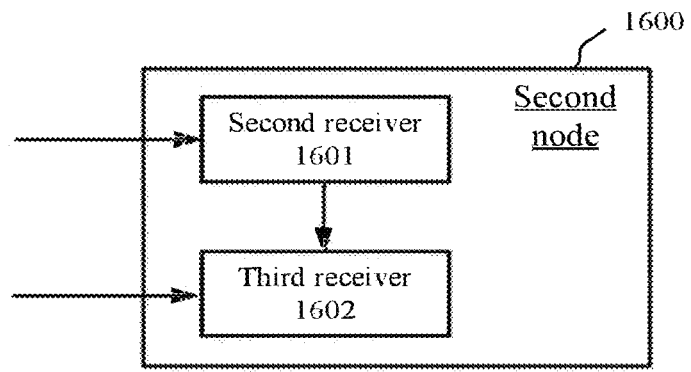
FIG. 16 illustrates a structure block diagram of a processing device in a second node according to one embodiment of the present application.

Embodiment 16 illustrates a structure block diagram of a processing device used in a second node, as shown in FIG. 16. In FIG. 16, a processing device 1600 in a second node mainly consists of a second receiver 1601 and a third receiver 1602.

In one embodiment, the second receiver 1601 comprises at least one of the antenna 420, the transmitter/receiver 418, the multi-antenna receiving processor 472, the receiving processor 470, the controller/processor 475 or the memory 476 in FIG. 4 of the present application.

In one embodiment, the third receiver 1602 comprises at least one of the antenna 420, the transmitter/receiver 418, the multi-antenna receiving processor 472, the receiving processor 470, the controller/processor 475 or the memory 476 in FIG. 4 of the present application.

In embodiment 16, the second receiver 1601 receives a first signaling; the third receiver 1602 receives a first reference signal and a second signal in a first time-frequency resource set; the first signaling is used to determine the first time-frequency resource set, and the first signaling is used to determine a number of time-frequency resource(s) used for the first reference signal in the first time-frequency resource set; the first reference signal is used to demodulate the second signal; the first reference signal and the second signal is transmitted through a first antenna port, the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to determine the first QCL relationship out of the Q candidate QCL relationships, Q being a positive integer greater than 1.

In one embodiment, any of the Q candidate QCL relationships comprises a candidate reference signal, the first QCL relationship comprises a first candidate reference signal, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q.

In one embodiment, any of the Q candidate QCL relationships comprises a QCL type, the first QCL relationship comprises a first QCL type, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q.

In one embodiment, the first signaling comprises first information, and the first information in the first signaling and the number of time-frequency resource(s) used for the first reference signal in the first time-frequency resource set are used together to determine the first QCL relationship out of the Q candidate QCL relationships.

In one embodiment, the third receiver 1602 receives second information; the second information and the number of time-frequency resource(s) used for the first reference signal in the first time-frequency resource set are used together to determine Q0 candidate QCL relationship(s) out of the Q candidate QCL relationships, and the first information is used to determine the first QCL relationship out of the Q0 candidate QCL relationship(s).

In one embodiment, the first signaling comprises first information, and the first information in the first signaling is used to determine the first QCL relationship out of the Q candidate QCL relationships; the number of time-frequency resource(s) used for the first reference signal in the first time-frequency resource set is used to determine whether the first information is disabled.

In one embodiment, the second node 1600 is a UE.

In one embodiment, the second node 1600 is a base station.

In one embodiment, the second node 1600 is a relay node.

In one embodiment, the second node 1600 is a UE supporting V2X communications.

In one embodiment, the second node 1600 is a base station supporting V2X communications.

In one embodiment, the second node 1600 is a relay node supporting V2X communications.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, tele-controlled aircrafts and other wireless communication devices. The second node in the present application includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, tele-controlled aircrafts and other wireless communication devices. The UE or terminal in the present application includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, tele-controlled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:
a first transmitter, transmitting a first signaling; and
a second transmitter, transmitting a first reference signal and a second signal through a first antenna port in a first time-frequency resource set;
wherein the first signaling is used to indicate the first time-frequency resource set, and the first signaling is used to indicate a number of time-frequency resource(s) used for the first reference signal in the first time-frequency resource set; the first reference signal is used to demodulate the second signal; the first antenna port conforms to a first Quasi Co-Located (QCL) relation, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to indicate the first QCL relationship out of the Q candidate QCL relationships, Q being a positive integer greater than 1; wherein a first receiver receives second information, the second information and the number of time-frequency resource(s) used for the first reference signal in the first time-frequency resource set are used together to determine Q0 candidate QCL relationship(s) out of the Q candidate QCL relationships, and the first information is used to determine the first QCL relationship out of the Q0 candidate QCL relationship(s).

2. The first node according to claim 1, wherein any of the Q candidate QCL relationships comprises a candidate reference signal, the first QCL relationship comprises a first candidate reference signal, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q;

or, any of the Q candidate QCL relationships comprises a QCL type, the first QCL relationship comprises a first QCL type, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q;

or, any of the Q candidate QCL relationships comprises a candidate reference signal and a QCL type, the first QCL relationship comprises a first candidate reference signal and a first QCL type, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q.

3. The first node according to claim 1, wherein the first signaling comprises first information, and the first information in the first signaling and the number of time-frequency resource(s) used for the first reference signal in the first time-frequency resource set are used together to determine the first QCL relationship out of the Q candidate QCL relationships;

or, the first signaling comprises first information, and the first information in the first signaling is used to determine the first QCL relationship out of the Q candidate QCL relationships; the number of time-frequency resource(s) used for the first reference signal in the first time-frequency resource set is used to determine whether the first information is disabled.

4. The first node according to claim 2, wherein the first signaling comprises first information, and the first information in the first signaling and the number of time-frequency resource(s) used for the first reference signal in the first time-frequency resource set are used together to determine the first QCL relationship out of the Q candidate QCL relationships;

or, the first signaling comprises first information, and the first information in the first signaling is used to determine the first QCL relationship out of the Q candidate QCL relationships; the number of time-frequency resource(s) used for the first reference signal in the first time-frequency resource set is used to determine whether the first information is disabled.

5. The first node according to claim 4, wherein a first receiver receives second information, the second information and the number of time-frequency resource(s) used for the first reference signal in the first time-frequency resource set are used together to determine Q0 candidate QCL relationship(s) out of the Q candidate QCL relationships, and the first information is used to determine the first QCL relationship out of the Q0 candidate QCL relationship(s).

6. A second node for wireless communications, comprising:

a second receiver, receiving a first signaling; and a third receiver, receiving a first reference signal and a second signal in a first time-frequency resource set;

wherein the first signaling is used to determine the first time-frequency resource set, and the first signaling is used to determine a number of time-frequency resource(s) used for the first reference signal in the first time-frequency resource set; the first reference signal is used to demodulate the second signal; the first reference signal and the second signal is transmitted through a first antenna port, the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to determine the first QCL relationship out of the Q candidate QCL relationships, Q being a positive integer greater than 1; wherein the third receiver receives second information; the second information and the number of time-frequency resource(s) used for the first reference signal in the first time-frequency resource set are used together to determine Q0 candidate QCL relationship(s) out of the Q candidate QCL relationships, and the first information is used to determine the first QCL relationship out of the Q0 candidate QCL relationship(s).

7. The second node according to claim 6, wherein the first signaling comprises first information, and the first information in the first signaling and the number of time-frequency resource(s) used for the first reference signal in the first time-frequency resource set are used together to determine the first QCL relationship out of the Q candidate QCL relationships;

or, the first signaling comprises first information, and the first information in the first signaling is used to determine the first QCL relationship out of the Q candidate QCL relationships; the number of time-frequency resource(s) used for the first reference signal in the first time-frequency resource set is used to determine whether the first information is disabled.

8. The second node according to claim 6, wherein any of the Q candidate QCL relationships comprises a candidate reference signal, the first QCL relationship comprises a first candidate reference signal, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q;

or, any of the Q candidate QCL relationships comprises a QCL type, the first QCL relationship comprises a first QCL type, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q;

or, any of the Q candidate QCL relationships comprises a candidate reference signal, the first QCL relationship comprises a first candidate reference signal and a first QCL type, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q; the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q.

9. The second node according to claim 7, wherein any of the Q candidate QCL relationships comprises a candidate reference signal, the first QCL relationship comprises a first candidate reference signal, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q;

or, any of the Q candidate QCL relationships comprises a QCL type, the first QCL relationship comprises a first QCL type, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q;

or, any of the Q candidate QCL relationships comprises a candidate reference signal and a QCL type, the first QCL relationship comprises a first candidate reference signal and a first QCL type, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q.

10. The second node according to claim 9, wherein the third receiver receives second information; the second information and the number of time-frequency resource(s) used for the first reference signal in the first time-frequency resource set are used together to determine Q0 candidate QCL relationship(s) out of the Q candidate QCL relationships, and the first information is used to determine the first QCL relationship out of the Q0 candidate QCL relationship(s).

11. A method in a first node for wireless communications, comprising:
transmitting a first signaling; and
transmitting a first reference signal and a second signal through a first antenna port in a first time-frequency resource set; and
receiving second information;
wherein the first signaling is used to indicate the first time-frequency resource set, and the first signaling is used to indicate a number of time-frequency resource(s) used for the first reference signal in the first time-frequency resource set; the first reference signal is used to demodulate the second signal; the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to indicate the first QCL relationship out of the Q candidate QCL relationships, Q being a positive integer greater than 1; wherein the second information and the number of time-frequency resource(s) used for the first reference signal in the first time-frequency resource set are used together to determine Q0 candidate QCL relationship(s) out of the Q candidate QCL relationships, and the first information is used to determine the first QCL relationship out of the Q0 candidate QCL relationship(s).

12. The method in a first node according to claim 11, wherein any of the Q candidate QCL relationships comprises a candidate reference signal, the first QCL relationship comprises a first candidate reference signal, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q;

or, any of the Q candidate QCL relationships comprises a QCL type, the first QCL relationship comprises a first QCL type, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q;

or, any of the Q candidate QCL relationships comprises a candidate reference signal and a QCL type, the first QCL relationship comprises a first candidate reference signal and a first QCL type, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q, and the first antenna port conforms to the first QCL type, the first QCL type is one of N QCL type(s), and the number of time-frequency resource(s) used for the first reference signal in the first time-frequency resource set is used to determine the first QCL type out of the N QCL type(s), N being a positive integer not greater than the Q.

13. The method according to claim 12, wherein the first signaling comprises first information, and the first information in the first signaling and the number of time-frequency resource(s) used for the first reference signal in the first time-frequency resource set are used together to determine the first QCL relationship out of the Q candidate QCL relationships;

or, the first signaling comprises first information, and the first information in the first signaling is used to determine the first QCL relationship out of the Q candidate QCL relationships; the number of time-frequency resource(s) used for the first reference signal in the first time-frequency resource set is used to determine whether the first information is disabled.

14. A method in a second node for wireless communications, comprising:

receiving a first signaling; and receiving a first reference signal and a second signal in a first time-frequency resource set; and receiving second information;

wherein the first signaling is used to determine the first time-frequency resource set, and the first signaling is used to determine a number of time-frequency resource(s) used for the first reference signal in the first time-frequency resource set; the first reference signal is used to demodulate the second signal; the first reference signal and the second signal is transmitted through a first antenna port, the first antenna port conforms to a first QCL relationship, and the first QCL relationship is one of Q candidate QCL relationships; any of the Q candidate QCL relationships comprises at least one of a candidate reference signal or a QCL type; the number of time-frequency resource(s) used for the first reference signal in the first time-frequency resource set is used to determine the first QCL relationship out of the Q candidate QCL relationships, Q being a positive integer greater than 1; wherein the second information and the number of time-frequency resource(s) used for the first reference signal in the first time-frequency resource set are used together to determine Q0 candidate QCL relationship(s) out of the Q candidate QCL relationships, and the first information is used to determine the first QCL relationship out of the Q0 candidate QCL relationship(s).

15. The method according to claim 14, wherein any of the Q candidate QCL relationships comprises a candidate reference signal, the first QCL relationship comprises a first candidate reference signal, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q;

or, any of the Q candidate QCL relationships comprises a QCL type, the first QCL relationship comprises a first QCL type, and the first antenna port conforms to the first QCL type; the first QCL type is one of N QCL type(s), and the number of time-frequency resource(s) used for the first reference signal in the first time-frequency resource set is used to determine the first QCL type out of the N QCL type(s), N being a positive integer not greater than the Q;

or, any of the Q candidate QCL relationships comprises a candidate reference signal and a QCL type, the first QCL relationship comprises a first candidate reference signal and a first QCL type, and the first antenna port is QCL with the first candidate reference signal; the first candidate reference signal is one of M candidate reference signal(s), and the number of time-frequency resource(s) used for the first reference signal in the first time-frequency resource set is used to determine the first candidate reference signal out of the M candidate reference signal(s), M being a positive integer not greater than the Q, and the first antenna port conforms to the first QCL type, the first QCL type is one of N QCL type(s), and the number of time-frequency resource(s) used for the first reference signal in the first time-frequency resource set is used to determine the first QCL type out of the N QCL type(s), N being a positive integer not greater than the Q.

16. The method according to claim 15, wherein the first signaling comprises first information, and the first information in the first signaling and the number of time-frequency resource(s) used for the first reference signal in the first time-frequency resource set are used together to determine the first QCL relationship out of the Q candidate QCL relationships;

or, the first signaling comprises first information, and the first information in the first signaling is used to determine the first QCL relationship out of the Q candidate QCL relationships; the number of time-frequency resource(s) used for the first reference signal in the first time-frequency resource set is used to determine whether the first information is disabled.

* * * * *